(12) United States Patent
Diaz et al.

(10) Patent No.: US 10,907,746 B2
(45) Date of Patent: Feb. 2, 2021

(54) LOW FLOW-RESTRICTION SHUT-OFF VALVE WITH EXCESS FLOW CLOSURE FUNCTIONALITY

(71) Applicant: EMERSON PROCESS MANAGEMENT REGULATOR TECHNOLOGIES, INC., McKinney, TX (US)

(72) Inventors: Juan M. Diaz, Melissa, TX (US); Roy R. Pelfrey, Sherman, TX (US); Tung K. Nguyen, McKinney, TX (US); Nadim Ahmed, McKinney, TX (US)

(73) Assignee: EMERSON PROCESS MANAGEMENT REGULATOR TECHNOLOGIES, INC., McKinney, TX (US)

( * ) Notice: Subject to any disclaimer, the term of this patent is extended or adjusted under 35 U.S.C. 154(b) by 0 days.

(21) Appl. No.: 16/448,760

(22) Filed: Jun. 21, 2019

(65) Prior Publication Data
US 2019/0309866 A1    Oct. 10, 2019

Related U.S. Application Data

(63) Continuation of application No. 15/148,372, filed on May 6, 2016, now Pat. No. 10,344,880.
(Continued)

(51) Int. Cl.
*F16K 17/00* (2006.01)
*F16K 1/20* (2006.01)
(Continued)

(52) U.S. Cl.
CPC .............. *F16K 17/32* (2013.01); *F16K 1/18* (2013.01); *F16K 1/2007* (2013.01);
(Continued)

(58) Field of Classification Search
CPC ....... Y10T 137/86984; Y10T 137/7898; Y10T 137/7727; Y10T 137/7728;
(Continued)

(56) References Cited

U.S. PATENT DOCUMENTS 2,165,640 A    7/1939  Marx
2,447,174 A    8/1948  Griffith
(Continued)

FOREIGN PATENT DOCUMENTS

CN    2308769 Y   ‡  2/1999
CN    202418753 U    9/2012
(Continued)

OTHER PUBLICATIONS

International Search Report for Application No. PCT/US2016/031205 dated Aug. 11, 2016.‡
(Continued)

*Primary Examiner* — Kelsey E Cary
(74) *Attorney, Agent, or Firm* — Marshall, Gerstein & Borun LLP

(57) ABSTRACT

A valve including a control assembly that is configured to control fluid flow through the valve, The control assembly includes a driving element and a valve member. The driving element is rotatable about an axis between a first operating state in which the driving element maintains contact between the valve member and a valve seat and a second operating state in which the driving element does not maintain contact between the valve member and the valve seat. The valve member is rotatable about the axis independent of the driving element when the driving element is in the second operating state.

21 Claims, 23 Drawing Sheets

Related U.S. Application Data

(60) Provisional application No. 62/167,887, filed on May 28, 2015, provisional application No. 62/158,368, filed on May 7, 2015.

(51) Int. Cl.
*F16K 15/03* (2006.01)
*F16K 17/32* (2006.01)
*F16K 1/24* (2006.01)
*F16K 27/02* (2006.01)
*F16K 1/18* (2006.01)

(52) U.S. Cl.
CPC .............. *F16K 1/2021* (2013.01); *F16K 1/24* (2013.01); *F16K 15/035* (2013.01); *F16K 27/0209* (2013.01); *Y10T 137/86984* (2015.04)

(58) Field of Classification Search
CPC ... Y10T 137/86976; F16K 17/32; F16K 1/18; F16K 1/2007; F16K 1/24; F16K 27/0209; F16K 1/2021; F16K 1/20; F16K 3/06; F16K 1/2014; F16K 15/035; F16K 15/181
USPC .................................. 251/303, 177, 211, 298
See application file for complete search history.

(56) References Cited

U.S. PATENT DOCUMENTS

| | | | |
|---|---|---|---|
| 3,525,350 A | 8/1970 | Hosek | |
| 3,804,124 A * | 4/1974 | Finke | F16K 1/24 137/630.14 |
| 4,067,359 A | 1/1978 | Kwast | |
| 4,457,486 A ‡ | 7/1984 | DeFrees | F16K 27/07 251/144 |
| 4,769,136 A ‡ | 9/1988 | McCormick | B01D 29/52 210/108 |
| 5,078,180 A ‡ | 1/1992 | Collins | B60R 15/00 137/554 |
| 5,758,682 A | 6/1998 | Cain | |
| 5,967,486 A ‡ | 10/1999 | McCrory | F16K 31/163 251/23 |
| 8,123,196 B1 * | 2/2012 | Chernoff | F16K 1/165 251/228 |
| 2006/0197043 A1 | 9/2006 | Santinanavat et al. | |
| 2011/0031802 A1‡ | 2/2011 | Dunigan | B60P 1/162 298/19 |
| 2014/0199931 A1* | 7/2014 | Hipsky | F16K 17/196 454/76 |
| 2017/0328485 A1* | 11/2017 | Yang | F16K 15/038 |

FOREIGN PATENT DOCUMENTS

| | | |
|---|---|---|
| DE | 3342945 A1 ‡ | 6/1985 |
| EP | 2848845 A1 ‡ | 3/2015 |
| JP | 2015004426 A | 1/2015 |

OTHER PUBLICATIONS

Written Opinion for Application No. PCT/US2016/031205 dated Aug. 11, 2016.‡
Office Action issued in Chinese Patent Application No. 201610298828.9, dated Dec. 29, 2018.
International Search Report and Written Opinion for PCT/US2016/031196, dated Aug. 11, 2016.
Office Action issued in Chinese Patent Application No. 201610298753.4, dated Dec. 28, 2018.

\* cited by examiner
‡ imported from a related application

LOW FLOW-RESTRICTION SHUT-OFF VALVE WITH EXCESS FLOW CLOSURE FUNCTIONALITY

CROSS-REFERENCE TO RELATED APPLICATIONS

The present application is a continuation of U.S. Non-Provisional patent application Ser. No. 15/148,372, filed May 6, 2016 and entitled "Actuator Assembly for a Low Flow-Restriction Shut-Off Valve with Excess Flow Closure Functionality" (Ref. No. 06005/573286), which claims priority to U.S. Provisional Patent Application No. 62/167,887, filed May 28, 2015 and entitled "Low Flow-Restriction Shut-Off Valve With Excess Flow Closure Functionality," and U.S. Provisional Patent Application No. 62/158,368, filed May 7, 2015 and entitled "Low Flow-Restriction Shut-Off Valve With Excess Flow Closure Functionality," and is related to U.S. Non-Provisional patent application Ser. No. 15/148,360, filed May 6, 2016 (now U.S. Pat. No. 10,132,418) and entitled "Low Flow-Restriction Shut-Off Valve With Excess Flow Closure Functionality" (Ref. No.: 06005/573224); the entire disclosure of each of these applications is hereby expressly incorporated by reference herein for all uses and purposes.

FIELD OF THE DISCLOSURE

The present disclosure is directed to process transfer or control systems and, more particularly, to an actuator assembly for a low flow-restriction shut-off valve with excess flow closure functionality.

BACKGROUND

Gas storage and distribution systems, such as systems used to store and distribute liquefied natural gas or liquefied petroleum gas, typically store gas from a producer in one or more tanks and then transport and deliver gas to a customer tank along a series of pipes and through a series of valves. In liquefied petroleum (LP) gas applications, the gas tank transfer system typically includes one or more excess flow internal valves that close in response to breakage in the gas storage and distribution system (e.g., due to damage in the downstream piping). However, these excess flow valves tend to undesirably introduce high flow-restriction into the system, which in turn leads to flow disruption and cavitation. Meanwhile, in liquefied natural gas (LNG) applications, the gas distribution system typically includes one or more gate or ball valves that function as primary shutoff valves. However, these gate or ball valves do not have the excess flow functionality provided by excess flow valves and do not offer much, if any, additional functionality.

SUMMARY

In accordance with a first exemplary aspect, an actuator is provided. The actuator is configured to be operatively coupled to a shut-off valve via a mounting assembly coupled to the shut-off valve, the shut-off valve including a movable stem for controlling fluid flow therethrough. The actuator includes a cylindrical body defined by a first body portion and a second body portion movable relative to the first body portion to expand or contract the cylindrical body. The actuator also includes a first end and a second end, the first end coupled to the first body portion and including a first opening adapted to receive a first arm of the mounting assembly coupled to a valve body of the shut-off valve, and the second end coupled to the second body portion and including a second opening adapted to receive a second arm of the mounting assembly operably coupled to the movable stem of the shut-off valve. The actuator further includes an inlet formed in the cylindrical body. The inlet is adapted to receive pressurized fluid from a pressure source; the cylindrical body expands or contracts responsive to the pressurized fluid received from the pressure source, thereby actuating the movable stem via the mounting assembly.

In accordance with a second exemplary aspect, an actuator assembly is provided for use with a shut-off valve including a valve body, a bonnet coupled to the valve body, and a movable stem supported by the bonnet for controlling fluid flow through the valve body. The actuator assembly includes a mounting assembly and an actuator configured to be operatively coupled to the shut-off valve via the mounting assembly. The mounting assembly includes a mounting bracket coupled to the bonnet of the shut-off valve and a mounting sleeve coupled to the movable stem of the shut-off valve, the mounting sleeve being movable relative to the mounting bracket. The mounting assembly further includes a first arm coupled to the mounting bracket and a second arm coupled to the mounting sleeve. The actuator includes a body defined by a first body portion and a second body portion movable relative to the first body portion to expand or contract the body, a first end coupled to the first body portion and including a first opening arranged to receive the first arm of the mounting assembly, a second end coupled to the second body portion and including a second opening arranged to receive the second arm of the mounting assembly, and an inlet formed in the body, the inlet adapted to receive pressurized fluid from a pressure source. The body expands or contracts responsive to the pressurized fluid received from the pressure source, and, responsive to the expansion or contraction of the body, the mounting sleeve moves relative to the mounting bracket, thereby actuating the movable stem.

In accordance with a third exemplary aspect, a shut-off valve for use in a fluid transport or storage system is provided. The shut-off valve includes a valve body, a seat, a flow control member, a bonnet, a stem, and an actuator assembly. The valve body defines an inlet port, an outlet port, and a fluid flow passageway extending between the inlet and the outlet. The seat is arranged in the fluid flow passageway. The flow control member is movable relative to the seat to control fluid flow through the fluid flow passageway. The bonnet is coupled to the valve body, and the stem is supported by the bonnet and operatively coupled to the flow control member, the stem being movable to move the flow control member. The actuator assembly is operatively coupled to the stem for controlling the flow control member and includes a mounting bracket, a mounting sleeve, and an actuator. The mounting bracket is coupled to the bonnet. The mounting sleeve is coupled to the stem and is movable relative to the mounting bracket. The actuator includes a body and an inlet formed in the body. The body is defined by a first body portion coupled to the mounting bracket and a second body portion coupled to the mounting sleeve, the second body portion movable relative to the first body portion to expand or contract the body. The inlet is adapted to receive pressurized fluid from a pressure source. The body expands or contracts responsive to the pressurized fluid received from the pressure source, and, responsive to the expansion or contraction of the body, the mounting sleeve moves relative to the mounting bracket, thereby moving the stem.

In further accordance with any one or more of the foregoing first, second, or third exemplary aspects, an actuator, an actuator assembly, or a shut-off valve may include any one or more of the following further preferred forms.

In one preferred form, the second body portion is telescopically engaged in the first body portion.

In another preferred form, the first and second ends include first and second tube-like ends, respectively. The first and second openings include first and second cylindrical openings, respectively.

In another preferred form, the mounting sleeve includes a cylindrical mounting sleeve that is slidable relative to the mounting bracket.

In another preferred form, the first arm extends outwardly from the mounting bracket in a direction substantially perpendicular to a length of the mounting sleeve.

In another preferred form, the second arm extends outwardly from the mounting sleeve in a direction substantially perpendicular to a length of the mounting sleeve.

In another preferred form, the second arm is arranged proximate to an end of the mounting sleeve.

In another preferred form, the actuator body is a cylindrical body, and the second body portion is telescopically engaged in the first body portion.

In another preferred form, when the body expands responsive to the pressurized fluid, the mounting sleeve is driven outward, away from the mounting bracket.

In another preferred form, the stem is a sliding stem.

In another preferred form, the mounting assembly further includes a first arm coupled to the mounting bracket and a second arm coupled to the mounting sleeve. The first body portion is coupled to the first arm and the second body portion is coupled to the second arm.

In another preferred form, the first arm extends outwardly from the mounting bracket in a direction substantially perpendicular to a length of the mounting sleeve, and the second arm extends outwardly from the mounting sleeve in the direction substantially perpendicular to a length of the mounting sleeve.

In another preferred form, the actuator includes a first end coupled to the first body portion and a second end coupled to the second body portion, the first end including a first opening arranged to receive the first arm, and the second end including a second opening arranged to receive the second arm.

In another preferred form, the first and second ends include first and second tube-like ends, respectively, and wherein the first and second openings include first and second cylindrical openings, respectively.

In another preferred form, the mounting sleeve includes a cylindrical mounting sleeve that is slidable relative to the mounting bracket.

In another preferred form, the mounting sleeve is removably disposed over at least a portion of the stem.

In another preferred form, the actuator body is a cylindrical body, and the second body portion is telescopically engaged in the first body portion.

In another preferred form, when the body expands responsive to the pressurized fluid, the mounting sleeve is driven outward, away from the mounting bracket, thereby driving the stem outward, away from the seat.

BRIEF DESCRIPTION OF THE DRAWINGS

The features of this invention which are believed to be novel are set forth with particularity in the appended claims. The invention may be best understood by reference to the following description taken in conjunction with the accompanying drawings, in which like reference numerals identify like elements in the several FIGS., in which:

DETAILED DESCRIPTION

FIGS. 1-6 depict a low-restriction excess flow valve 100 constructed in accordance with the principles of the present invention. The excess flow valve 100 is generally configured for use in gas or liquid applications (e.g., liquefied petroleum applications, liquefied natural gas applications, liquefied nitrogen applications), but it will be understood that the valve 100 can alternatively or additionally be used in other process control applications. In use, the excess flow valve 100 provides excess flow closure capacity protection while simultaneously providing minimal flow-restriction, thereby minimizing, if not eliminating, flow disruption and cavitation, which often occurs in known excess flow valves.

Figure 1:
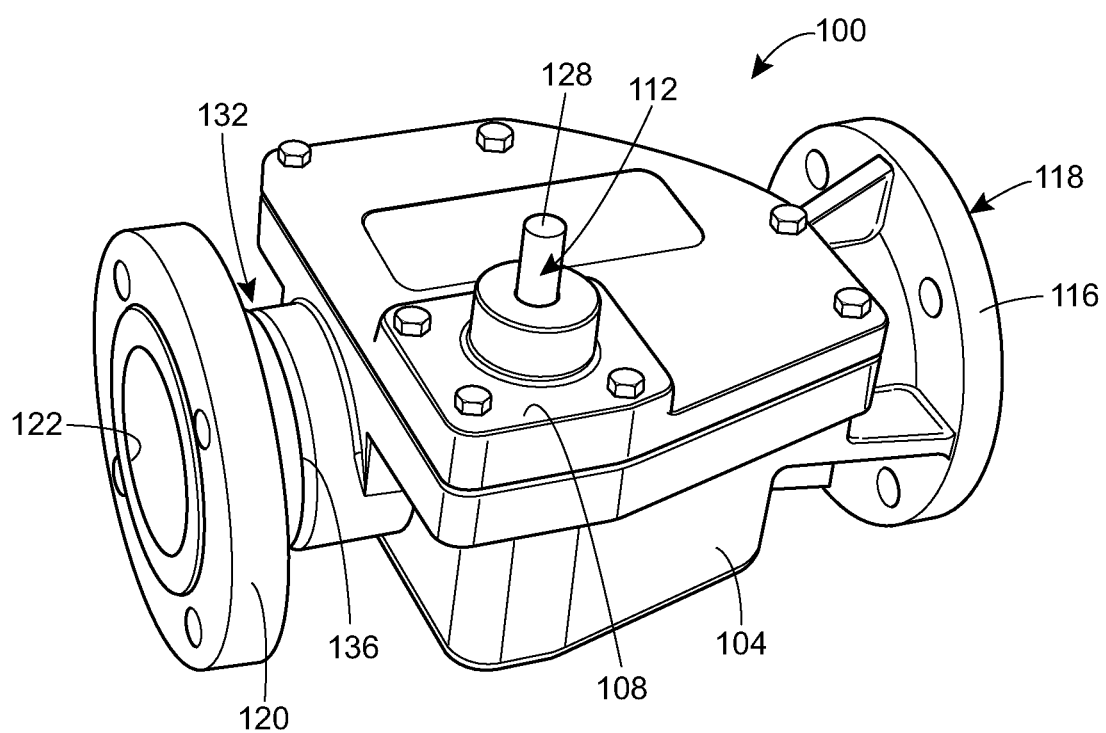
FIG. 1 is a perspective view of one example of an excess flow valve constructed in accordance with the principles of the present invention.
Figure 2:
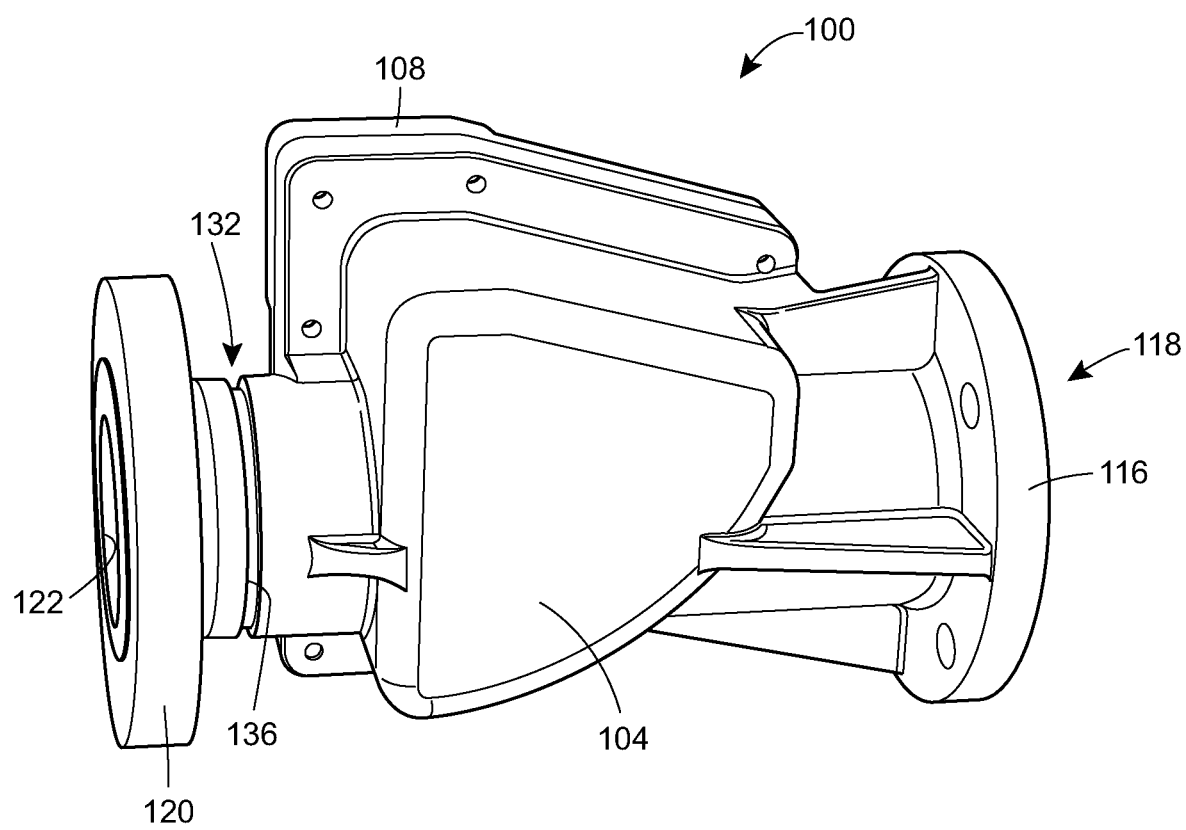
FIG. 2 is a bottom perspective view of the excess flow valve of FIG. 1.
Figure 3:
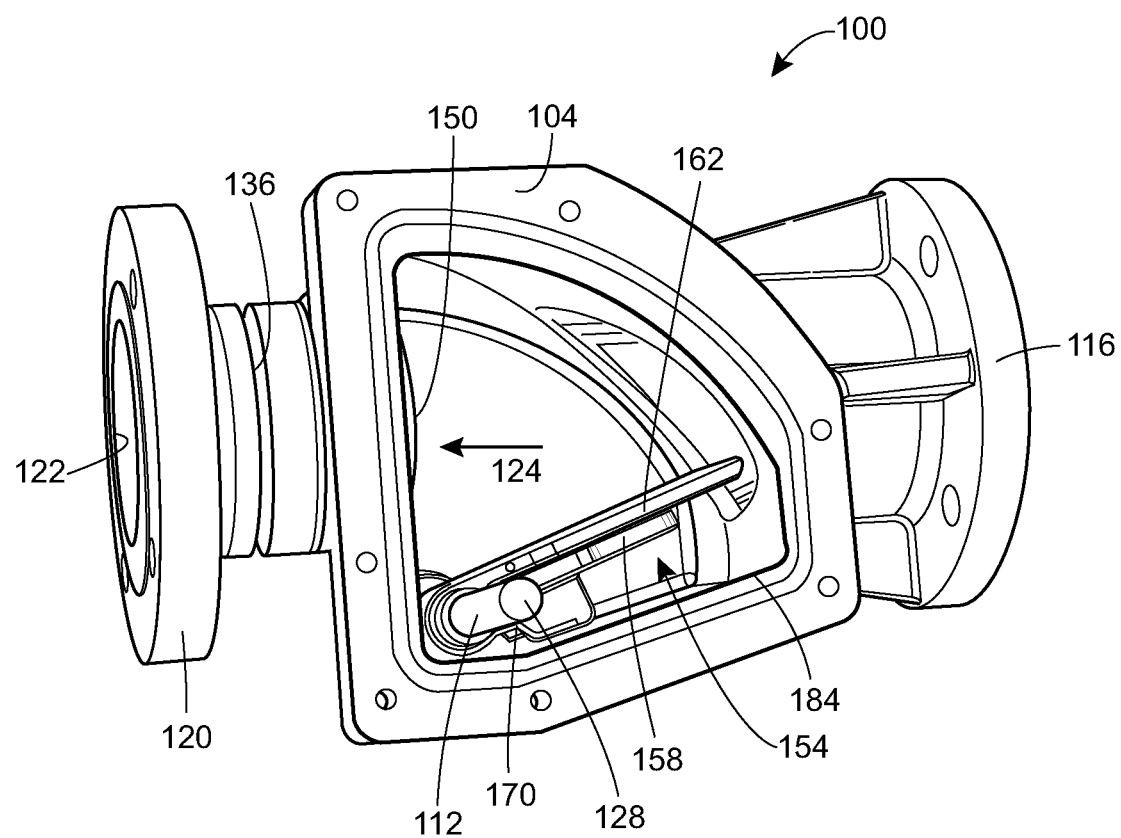
FIG. 3 is a front perspective view of the internal components of the excess flow valve of FIG. 1.

As illustrated in FIGS. 1-3, the excess flow valve 100 includes a valve body 104, a bonnet 108 coupled (e.g., removably coupled) to the valve body 104, and a shaft 112 operatively coupled to the valve body 104 via the bonnet 108.

The body 104 has an inlet connection 116 that defines an inlet port 118, an outlet connection 120 that defines an outlet port 122, and a fluid flow passageway 124 extending between the inlet port 118 and the outlet port 122. While not illustrated herein, when the flow valve 100 is used in gas applications, the inlet connection 116 is connected to a tank (not shown), e.g., a cryogenic tank, and the outlet connection 120 is connected to piping downstream of the excess flow valve 100. Of course, when the valve 100 is used in other process transfer or control applications, the inlet and/or outlet connections 116, 120 can be connected to components in those process transfer or control systems, as appropriate. The inlet and/or outlet connections 116, 120 can be threaded, flanged, or welded. When connected, the excess flow valve 100 facilitates the transfer of fluid (e.g., gas, liquid) from the tank arranged upstream of the valve 100 to piping arranged downstream of the valve 100 via the fluid flow passageway 124.

The bonnet 108 is, at least in this example, removably coupled to the valve body 104, such that the bonnet 108 can be removed and the internal components of the valve 100 arranged therein can be repaired or serviced (and in some cases replaced) while the flow valve 100 remains in-line. The bonnet 108 provides support for the shaft 112, which is partially disposed in the valve body 104 along an axis that is substantially perpendicular to the fluid flow passageway 124 and protrudes outside of the body 104 and the bonnet 108. So positioned, a protruding end 128 of the shaft 112 can be coupled to an external actuator (not shown), such as a pneumatic actuator, a manual actuator, a mechanical actuator, or an electric actuator. When actuated, the shaft 112 rotates within the valve body 104 to control fluid flow through the fluid flow passageway 124, as will be described below.

With continued reference to FIGS. 1-3, the excess flow valve 100 also includes a break-away safety mechanism 132. The break-away safety mechanism 132 in this example takes the form of an area of the valve body 104 that is locally weaker in tension than the rest of the valve body 104. Specifically, the break-away mechanism 132 takes the form of a channel 136 that extends circumferentially around the valve body 104 between the bonnet 108 and the outlet connection 120. The channel 136 focuses tensile stresses so that in the event of an accident that damages the downstream piping, the valve body 104 fails in the region of the channel 136 before failing at any other location, thereby protecting the integrity of the internal components of the valve body 104 and sealing any fluid within the valve body 104. Optionally, external stiffening gussets can be added to the valve body 104 to add strength and robustness upstream of the break-away point (the location of the break-away mechanism 132).

As illustrated in FIGS. 3-6, the excess flow valve 100 also includes a seat 150 and a control assembly 154 that is operatively coupled to the shaft 112 so as to be movable relative to the seat 150 to control the fluid flow through the fluid flow passageway 124. As best illustrated in FIG. 3, the seat 150 is arranged in the valve body 104 adjacent the outlet port 122. The seat 150 can be integrally formed with the valve body 104 or can be removably coupled thereto (and thus can be removed and replaced when necessary). The seat 150 can be made of metal, plastic (e.g., an elastomeric material), or combinations thereof. The control assembly 154 illustrated in FIGS. 3-6 includes a driving element 158, a valve member 162, a first biasing element 166 arranged between the driving element 158 and the valve body 104, and a second biasing element 170 arranged between the driving element 158 and the valve member 162.

Figure 4:
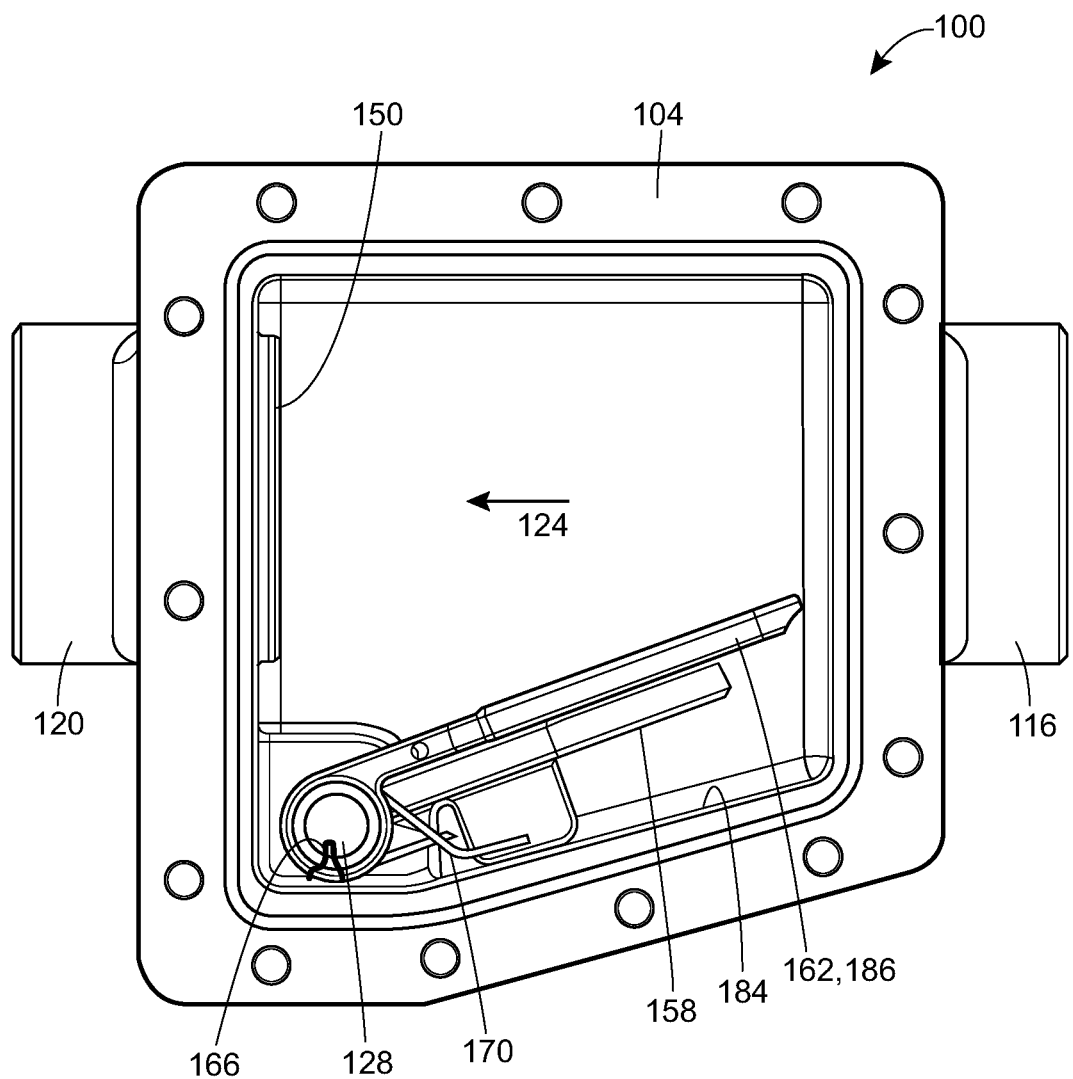
FIG. 4 is a plan view of the internal components of the excess flow valve of FIG. 1, with the excess flow valve shown having welded end connections.
Figure 5:
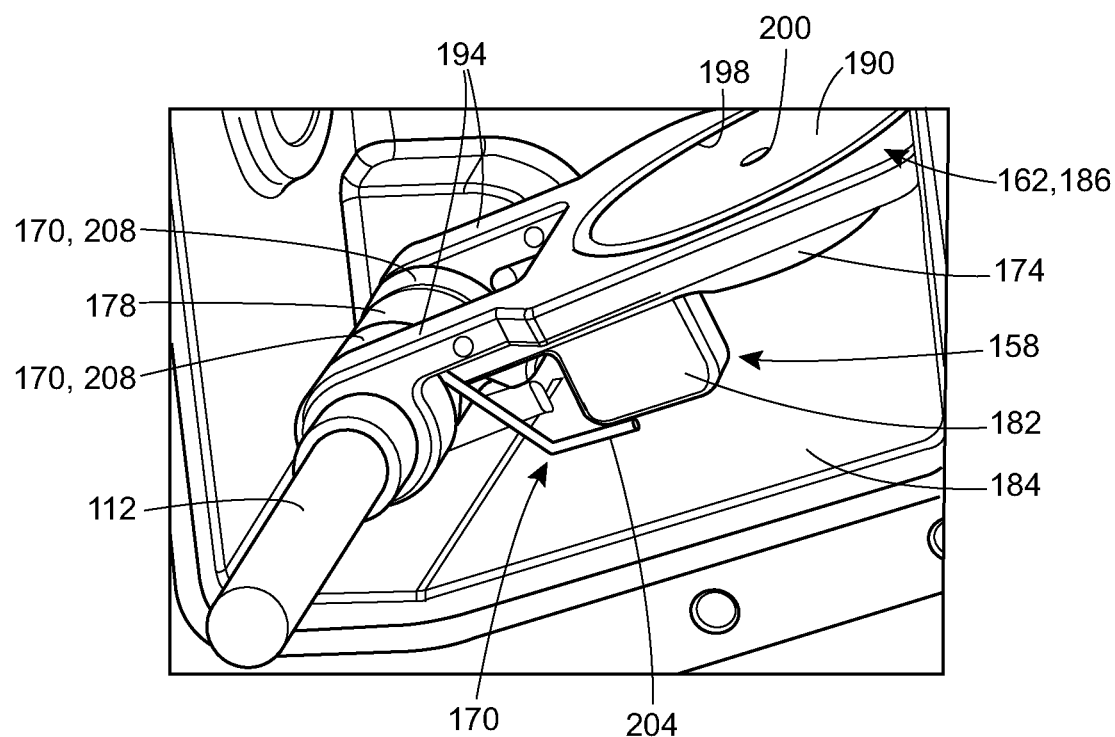
FIG. 5 is a partial, close-up view of a control assembly shown in FIG. 4.
Figure 6:
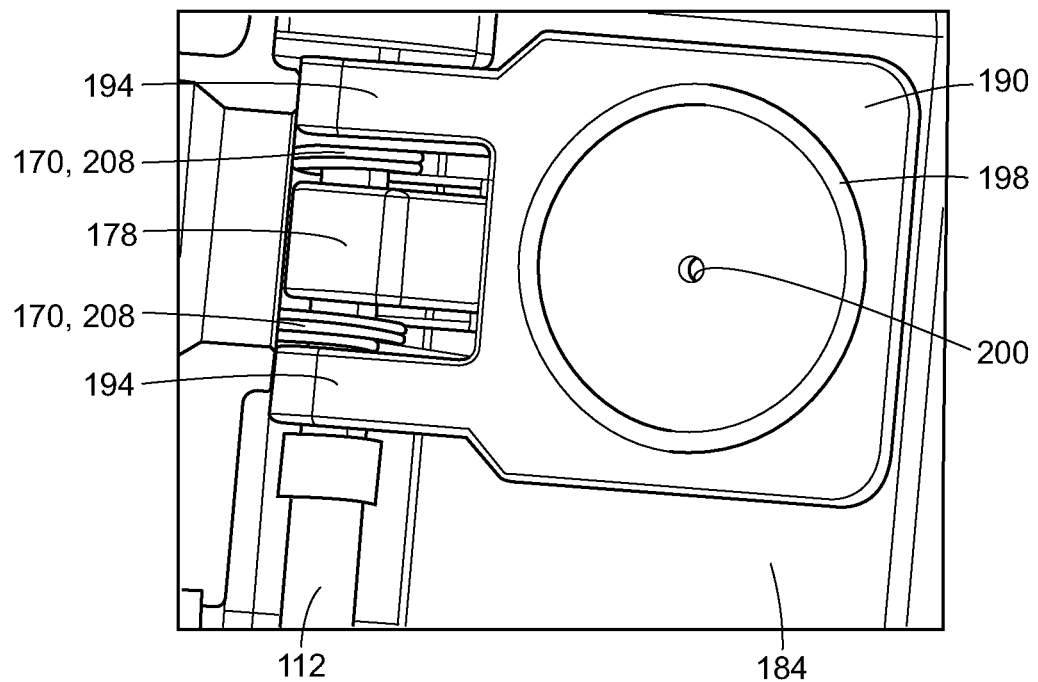
FIG. 6 is another partial, close-up view of the control assembly shown in FIG. 4.

As best illustrated in FIGS. 4-6, the driving element 158 in this example has a base 174, an arm 178, and a cap 182. The arm 178 extends outwardly from the base 174 and is secured to, and surrounds, a portion of the shaft 112, such that the driving element 158 is operatively coupled to the shaft 112. The cap 182, meanwhile, is coupled to and extends outwardly from a central portion of the base 174. The cap 182 can be secured to the base 174 (e.g., via fasteners) or can be integrally formed with the base 174 of the driving element 158. In any event, the cap 182 is configured to engage an interior wall 184 of the valve body 104 when the driving element 158 is in a fully-open position, thereby serving as a stop for, and preventing any further movement of, the driving element 158.

Referring still to FIGS. 4-6, the valve member 162 in this example takes the form of a flapper 186 having a base 190 and a pair of parallel arms 194. The base 190 in this example has a substantially rectangular shape, though a rounded or other shape is possible. A seating channel 198 is defined or formed in the base 190 for receiving and sealingly engaging the seat 150 to shut-off flow through the valve 100 (i.e., to close the valve 100). The seating surface 198 can be metal, plastic (e.g., made of an elastomeric material), or combinations thereof. The valve member 162 also includes a bleed hole 200 defined or formed in a portion of the base 190. The bleed hole 200 is configured to facilitate limited bleeding to facilitate pressure equalization across the valve 100, as will be described below. The bleed hole 200 in this example is centrally located on the base 190 and is surrounded by the seating surface 198, though in other examples the bleed hole 200 can be arranged elsewhere. The arms 194 extend outwardly from the base 190 and are secured to, and surround, different portions of the shaft 112, such that the valve member 162 is operatively coupled to the shaft 112. As best illustrated in FIG. 6, in one example the arm 178 of the driving element 158 is secured to the shaft 112 at a position between (i.e., radially inward of) the arms 194 of the valve member 162.

As best illustrated in FIG. 4, the first biasing element 166 in this example, while difficult to see, takes the form of a torsion spring having one end affixed to an interior portion of the valve body 104 and another end affixed to a portion of the driving element 158. As such, the first biasing element 166 is configured to bias the valve member 162 away from the interior wall 184 of the valve body 104 and toward the seat 150, i.e., to a closed position.

Referring again to FIGS. 4-6, the second biasing element 170 in this example takes the form of a torsion spring having one end 204 coupled to a portion of the driving element 158 and another end 208, opposite the end 204, secured around the arms 194 of the valve member 162. So arranged, the second biasing element 170 is configured to bias the driving element 158 and the valve member 162 toward one another.

With the valve 100 constructed as described, the valve 100 is configured to provide an excess flow closure function and, at the same time, minimal flow-restriction. Moreover, the excess flow valve 100 is configured to protect the integrity of the valve sealing area and contain any fluid within the valve 100 in the event of an accident that damages piping downstream of the valve 100. FIGS. 7-10 will be used to describe how the excess flow valve 100 can, in operation, achieve these functions.

Figure 7:
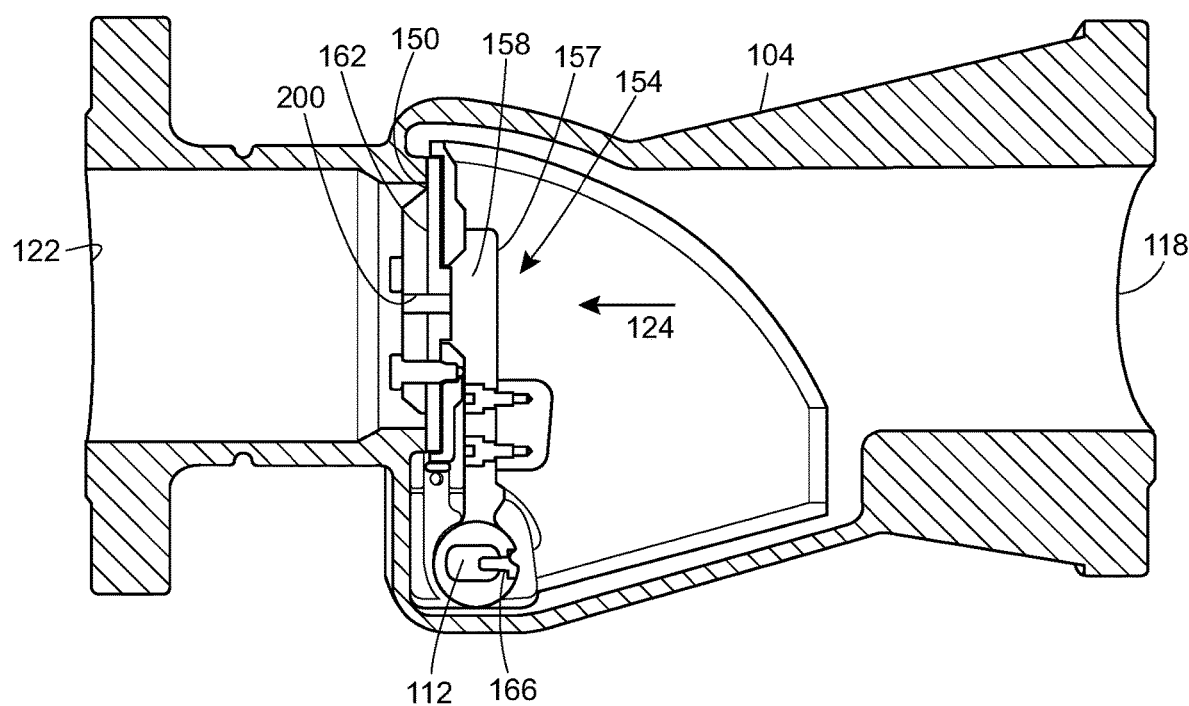
FIG. 7 is a plan view of the internal components of the excess flow valve of FIG. 1 when the excess flow valve is in a closed position.

FIG. 7 illustrates the valve 100 in its initial, closed position, which occurs when the shaft 112 is not actuated by the external actuator (i.e., no external actuation is applied to the shaft 112). Without such actuation, the control assembly 154 is oriented in a closed position in which the driving element 158 and the valve member 162 are substantially perpendicular to the fluid flow passageway 124, the valve member 162 sealingly engages the seat 150, and the driving element 158 is in direct contact with the valve member 162. The driving element 158 not only supports the valve member 162, but also covers the bleed hole 200 of the valve member 162, thereby preventing any fluid flow between the inlet port 118 and the outlet port 122. The control assembly 154 is so oriented because the first biasing element 166 biases the driving element 158 toward the seat 150, while the second biasing element 170 biases the driving element 158 and the valve member 162 toward one another. With no external actuation forces present, the biasing forces applied by the first and second biasing elements 166, 170 maintain the control assembly 154 in this closed position. Moreover, any fluid flow upstream of the closed control assembly 154 will apply a net force (in the leftward direction in FIG. 7) on an underside 157 of the driving element 158, helping to maintain the driving element 158 and the valve member 162 in the closed position.

Figure 8:
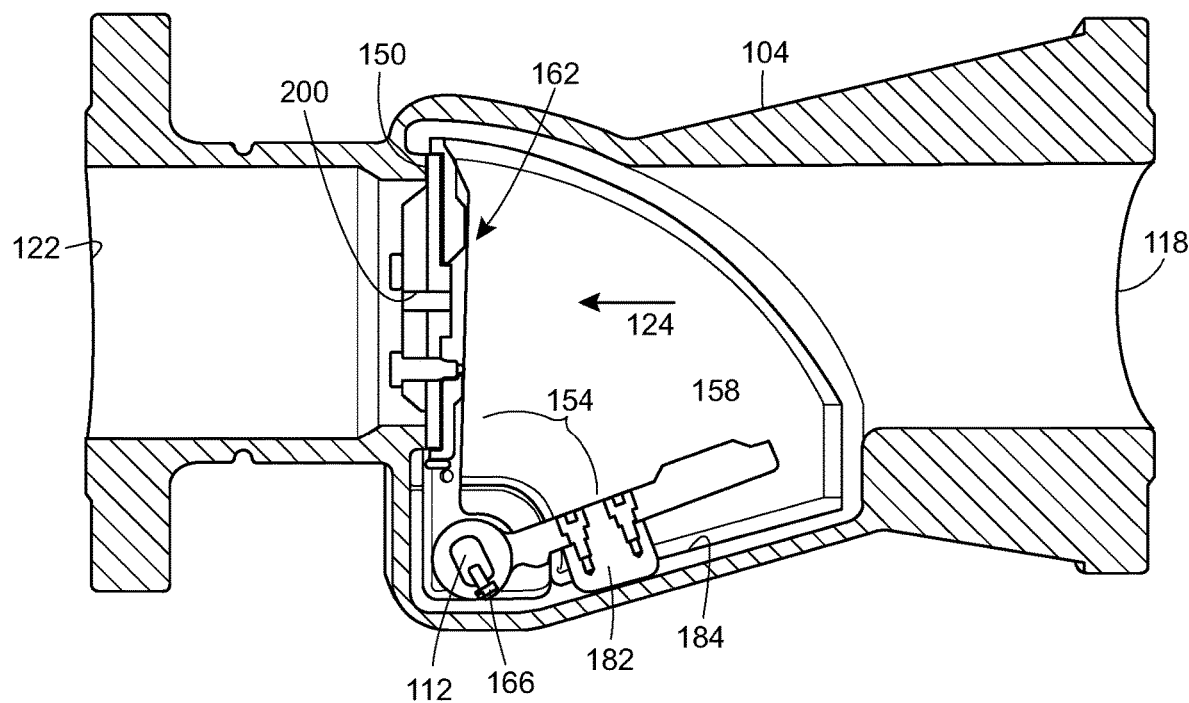
FIG. 8 is similar to FIG. 7, but shows the internal components of the excess flow valve when the excess flow valve is in a first bleed position.

When, however, an external actuation force that exceeds the biasing force exerted by the first biasing element 166 is applied by the external actuator to the shaft 112, the shaft 112 rotates in such a way that causes the valve 100, specifically the control assembly 154, to move to the limited bleed position illustrated in FIG. 8. More specifically, the external actuation force rotates the shaft 112 in such a way that the driving element 158 is rotated about the shaft axis in a clockwise direction, away from the seat 150 and toward the interior wall 184 of the valve body 104, as illustrated in FIG. 8. The external actuation force will, at least in this example, rotate the driving element 158 in the clockwise direction until the cap 182 of the driving element 158 contacts the interior wall 184, which prevents any further movement of the driving element 158. At least initially, until the pressure at the outlet port 122 is substantially equal to the pressure at the inlet port 118, the driving element 158 will be moved away, and thus separated, from the valve member 162. This occurs because the pressure associated with fluid flow upstream of the seat 150 initially exceeds the pressure associated with fluid flow downstream of the seat 150; therefore, the fluid flow will apply a net force (leftward) on the valve member 162, keeping the valve member 162 in sealing engagement with the seat 150. As the driving element 158 has been moved away from the valve member 162, thereby uncovering the bleed hole 200, fluid will begin flowing (or bleeding) to the outlet port 122 through the bleed hole 200 formed in the valve member 162. This bleeding will continue until pressure equalization, whereby the pressure at the outlet port 122 is substantially equal to the inlet port 118, has been achieved.

Figure 9:
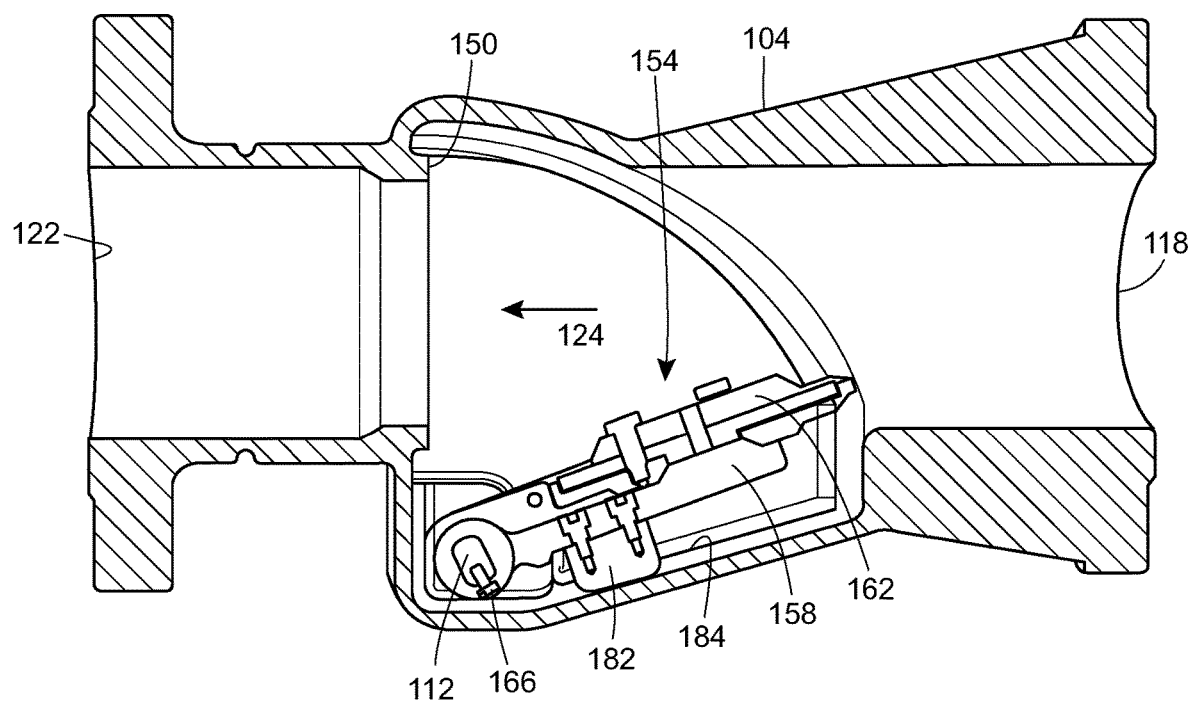
FIG. 9 is similar to FIG. 7, but shows the internal components of the excess flow valve when the excess flow valve is in an open position.
Figure 10:
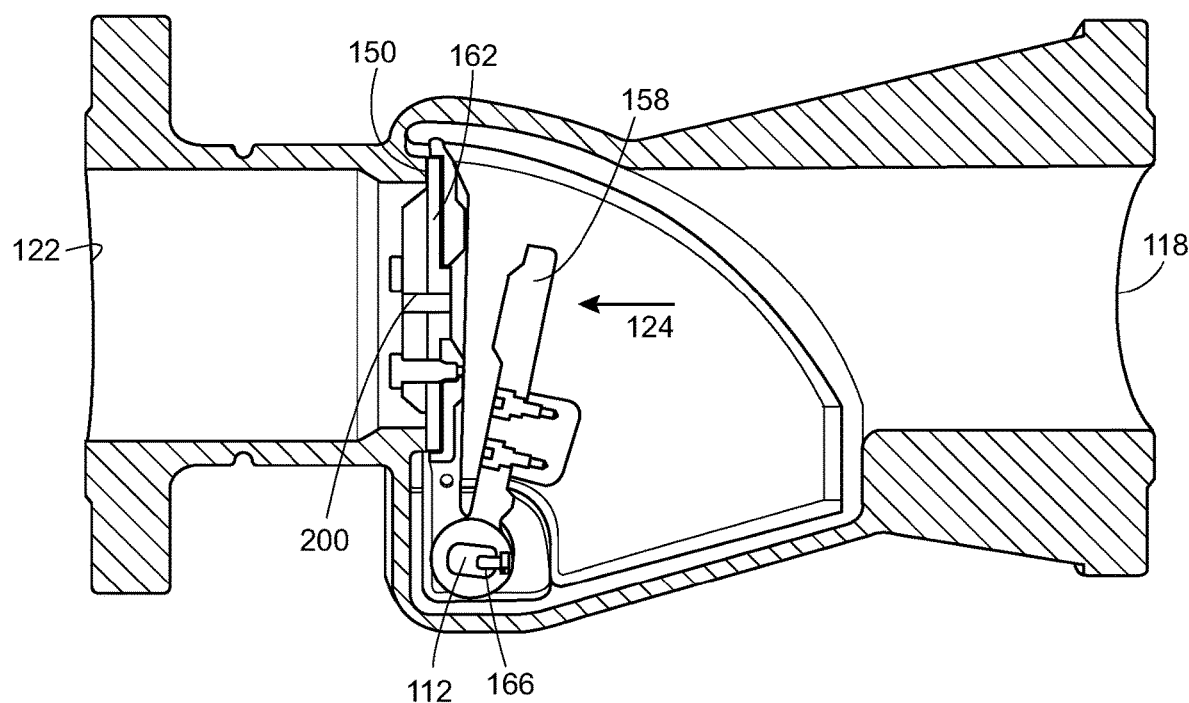
FIG. 10 is similar to FIG. 7, but shows the internal components of the excess flow valve when a valve driver of the excess flow valve is being opened or closed.

When pressure equalization has been achieved, the fluid flow in the valve 100 will no longer apply any significant forces on the valve member 162, thereby enabling the valve 100, specifically the control assembly 154, to move to the fully open position illustrated in FIG. 9. More specifically, pressure equalization enables the valve member 162 to swing or rotate in a clockwise direction toward and into contact with the driving element 158. The driving element 158 and the valve member 162 are subsequently arranged at an angle relative to the fluid flow passageway 124. The angle may, for example, be approximately 5 degrees, approximately 10 degrees, approximately 15 degrees, or some other value between approximately 0 degrees and approximately 90 degrees. As such, the control assembly 154, particularly the valve member 162, is seated substantially outside of the fluid flow passageway 124, with only an end portion of the control assembly 154 being disposed within the fluid flow passageway 124. As a result, the control assembly 154, particularly the valve member 162, provides very little restriction against any fluid flowing in the fluid flow passageway 124. Indeed, this allows the valve 100 to have a flow coefficient $C_v$ greater than the flow coefficient $C_v$ for known excess flow internal valves. As an example, the valve 100 may have a flow coefficient $C_v$ of approximately 250-350, whereas known excess flow internal valves typically have a flow coefficient $C_v$ of approximately 100. The size and/or shape of the fluid flow passageway 124 can, if desired, be altered to increase or decrease the flow coefficient $C_v$. In any event, the valve 100, by providing minimal fluid flow-restriction, substantially reduces, if not eliminates, the risk for cavitation, which can occur as a result of flow disruption.

When the control assembly 154 is in the fully open position illustrated in FIG. 9, fluid can flow freely in the fluid flow passageway 124 from the inlet port 118 to the outlet port 122. However, in the event that fluid flow entering the valve 100 through the inlet port 118 reaches an excess flow condition, the valve 100, specifically the control assembly 154, moves to the limited bleed position illustrated in FIG. 8. As is known in the art, the excess flow condition occurs when the fluid flow reaches or exceeds a predetermined limit, typically caused by pressure loss in the process transfer or control system (e.g., because a downstream pipe has broken, etc.). This predetermined limit may, for example, correspond to a percentage (e.g., 200%) of the capacity the valve 100 is designed to handle. In any event, when this excess flow condition has been reached, the drag force from the fluid entering the valve 100 through the inlet port 118 will exceed the biasing force applied by the second biasing element 170, and, as such, the drag force will drive the valve member 162 in a counter-clockwise direction. The drag force drives the valve member 162 away from the driving element 158, which remains in the fully open position, and toward and into sealing engagement with the valve seat 150. Because the driving element 158 remains in the fully open position, the bleed hole 200 in the valve member 162 is exposed, such that a limited amount of fluid can flow (i.e., bleed) therethrough.

It will be appreciated that because the control assembly 154 is substantially seated outside of the fluid flow passageway 124 in the fully open position, the pressure drop across the valve member 162 is significantly lower than the pressure drop seen in known excess flow internal valves. In other words, the valve 100 has the ability to provide a higher excess flow capacity than known excess flow internal valves.

In the event that the process transfer or control system breakage is fixed, thereby alleviating the excess flow condition, the limited bleeding through the bleed hole 200 persists until pressure equalization has been restored. In other words, the control assembly 154 remains in the bleed position illustrated in FIG. 8, and fluid flows through the bleed hole 200, until the pressure at the outlet port 122 is substantially equal to the pressure at the inlet port 118. When pressure equalization has been restored, the second biasing element 170 pulls the valve member 162 back to the position illustrated in FIG. 9, thereby returning the valve 100, specifically the control assembly 154, to the fully open position.

In the event that the process transfer or control system cannot be fixed or fixing the process transfer or control system is not desirable, the valve 100 can be easily and safely fully shutoff by de-energizing the external actuation (i.e., removing the actuation force applied to the shaft 112). Without any external actuation, the driving element 158 also returns to the closed position illustrated in FIG. 7. More specifically, the driving element 158 moves toward and into contact with the valve member 162, which is already in sealing engagement with the seat 150. This movement of the driving element 158 covers the bleed hole 200, eliminating the limited bleed through the valve 100 and fully closing the valve 100.

Figure 11:
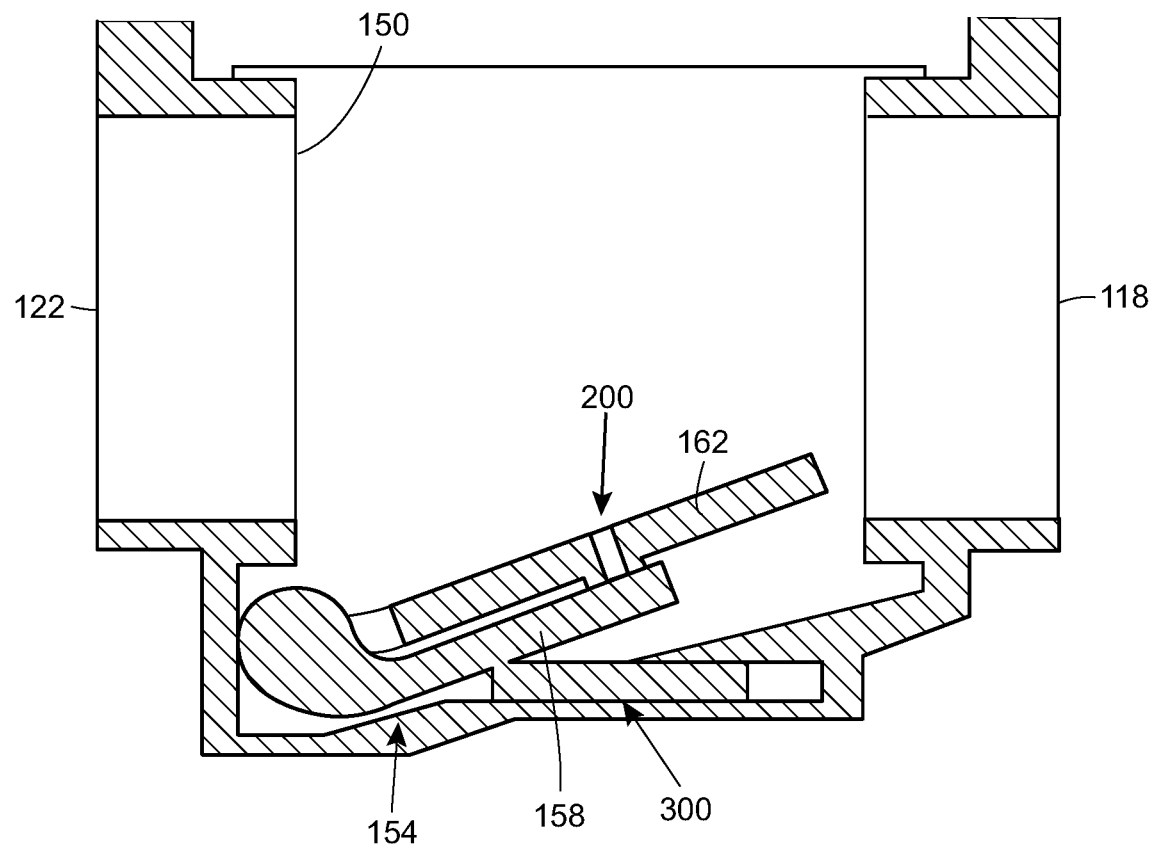
FIG. 11 illustrates one example of an adjuster that can be utilized in the excess flow valve of FIG. 1 to vary the excess flow capacity of the excess flow valve.

Optionally, the excess flow valve 100 can, as is illustrated in FIG. 11, include an adjuster 300, e.g., a set screw, that facilitates adjustment of the excess flow capacity for the valve 100. The adjuster 300 in this example is externally exposed and actuatable by an operator of the valve 100. The adjuster 300 is movable in a direction substantially parallel to the fluid flow passageway 124. When an operator of the valve 100 moves the adjuster 300 inward, toward the outlet port 122, the adjuster 300 drives the driving element 158 in a counter-clockwise direction, which in turn changes the angle of the valve member 162 relative to the fluid flow passageway 124. As a result, more of the valve member 162 is disposed within the fluid flow passageway 124. This serves to reduce the amount of drag force required to move the valve member 162 to the closed position in the event of an excess flow condition, thereby decreasing the excess flow capacity of the valve 100. Conversely, when an operator of the valve 100 moves the adjuster 300 outward, toward the inlet port 118, the driving element 158 moves (i.e., falls) in a clockwise direction, such that less of the valve member 162 is disposed within the fluid flow passageway 124. This action thus serves to increase the amount of drag force required to move the valve member 162 to the closed position in the event of an excess flow condition, thereby increasing the excess flow capacity of the valve 100.

In other examples, the adjuster 300 can be arranged internally within the valve 100 and actuated in a different manner (e.g., using an external actuator). Moreover, the adjuster 300 can be arranged differently relative to the control assembly 154, such that the adjuster 300 may be movable in a different direction (e.g., perpendicular to the fluid flow passageway 124) and/or ultimately move the valve member 162 in a different manner. Further yet, while the adjuster 300 can be employed to facilitate adjustment of the excess flow capacity for the valve 100, the angle of the valve member 162 can be adjusted, without using the adjuster 300, to achieve a similar effect. Likewise, the biasing elements 166, 170 can be altered, in terms of structure and/or biasing force, to vary the excess flow capacity of the valve 100. As an example, the biasing element 166 and/or the biasing element 170 can take the form of extension springs, compression springs, constant-force springs, leaf springs, or other biasing elements (e.g., latches).

Figure 12A:
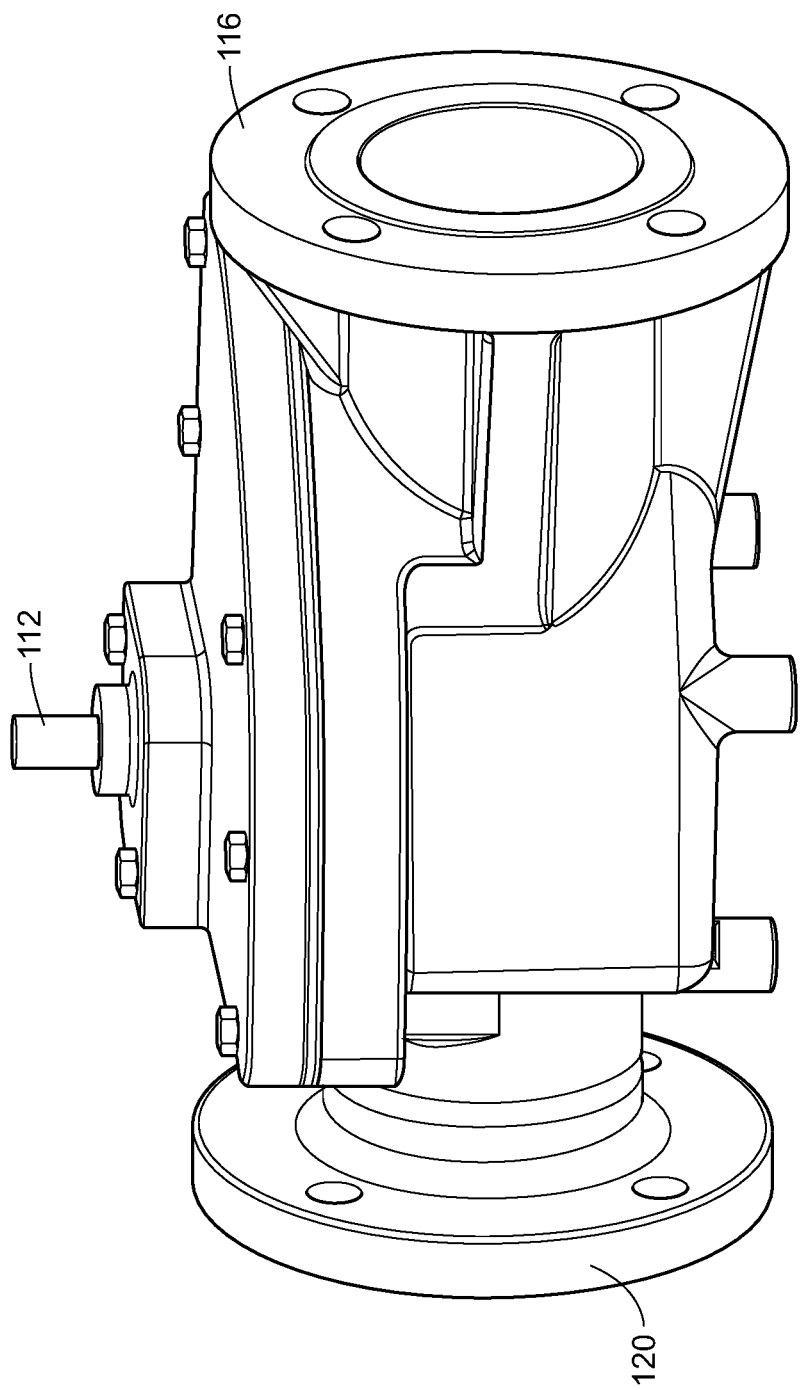
FIGS. 12A and 12B illustrate another example of an excess flow valve constructed in accordance with the principles of the present invention.
Figure 12B:
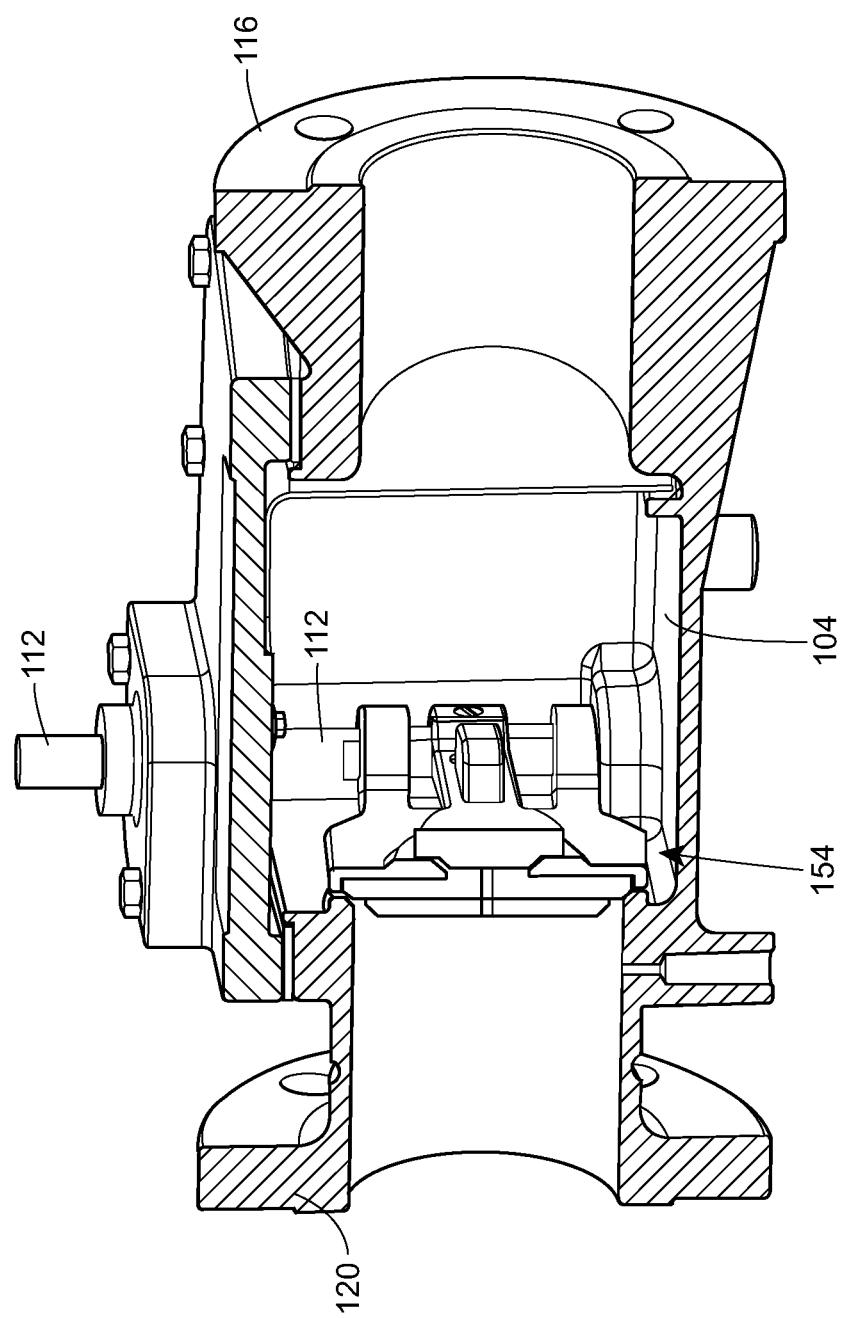

It will also be appreciated that the valve body 104, the bonnet 108, the shaft 112, and/or the break-away shaft mechanism 132 can vary from what is illustrated in FIGS. 1-10 and yet still perform the intended functionality. More specifically, the shape, size, and/or style of the valve body 104 can vary. In one example, the shape and/or size of the inlet and/or outlet connections 116, 120 can vary, for example when it is desired to utilize the excess flow valve 100 in a different environment having different sized tanks and/or piping. In some examples, the shaft 112 can be arranged in a different manner, e.g., oriented along a different axis or located in a different position relative to the flow path (e.g., further from the outlet port 122). As an example, as illustrated in FIGS. 12A and 12B, the shaft 112 can be supported in a different portion of the valve body 104 and oriented along a different axis relative to the valve body 104. In another example, the shaft 112 can be oriented such that clockwise rotation, rather than counter-clockwise rotation, of the shaft 112 moves the control assembly 154 from the open position to the bleed positions and the closed position. The shaft 112 can also be entirely contained within the valve body 104, such that the shaft 112 does not protrude outside of the body 104 (and the valve 100 is an internal valve). In such a case, it may be desirable to introduce a shaft follower immediately adjacent the outlet port 122. If desired, the break-away safety mechanism 132 can take on other forms as well. As an example, the break-away safety mechanism 132 may be formed as a gradually thinning portion of the valve body 104, from a different, weaker material, or using mounting studs with notches or grooves to provide a primary failure location. The break-away shaft mechanism 132 may also be re-positioned as well. As an example, when the valve 100 is designed as an internal valve and includes a shaft follower adjacent the outlet port 122, the break-away shaft mechanism 132 may be located between the seat 150 and the shaft follower.

Alternatively or additionally, the construction and/or actuation of the control assembly 154 can vary from what is illustrated in FIGS. 1-10 and yet still perform the intended functionality. In other examples, the shape and/or size of the driving element 158 and/or the valve member 162 can be varied to, for example, alter the excess flow capacity of the valve 100, to alter the necessary actuation force and/or biasing force(s), or for some other reason. In another example, the valve member 162 need not include the bleed hole 200, in which case the valve 100 would no longer have any sort of bleeding capabilities when responding to an issue in the process transfer or control system. In other examples, the control assembly 154 can also be actuated in a different manner. While the control assembly 154 described in connection with FIGS. 1-10 is externally actuated in a rotational manner, the control assembly 154 can instead be externally or internally actuated in a linear (e.g., sliding) manner, as is, for example, illustrated in FIGS. 13-17.

Figure 13:
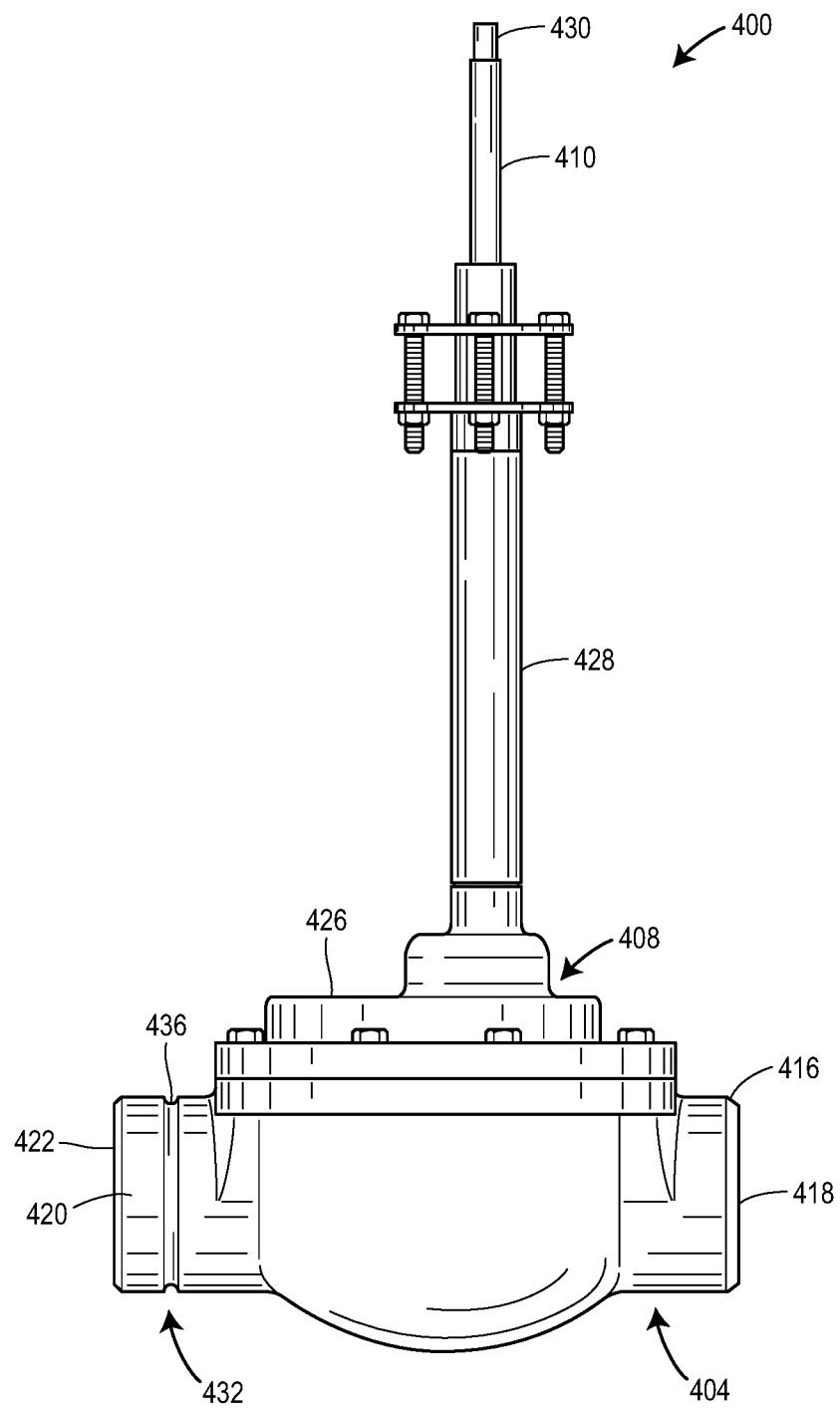
FIG. 13 is a perspective view of another example of an excess flow valve constructed in accordance with the principles of the present invention.
Figure 14:
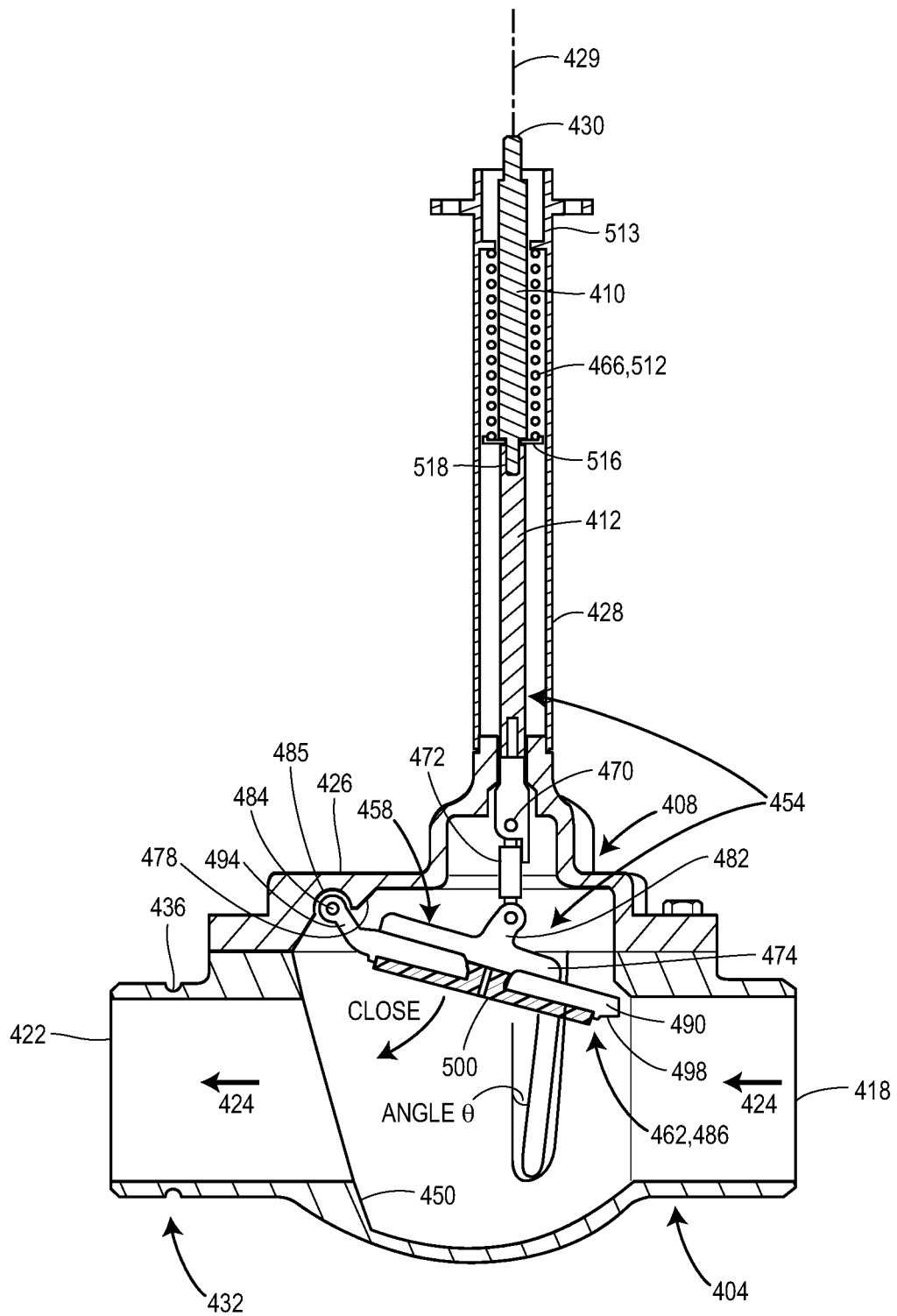
FIG. 14 is a front perspective view of the internal components of the excess flow valve of FIG. 13 when the excess flow valve is in an open position.
Figure 15:
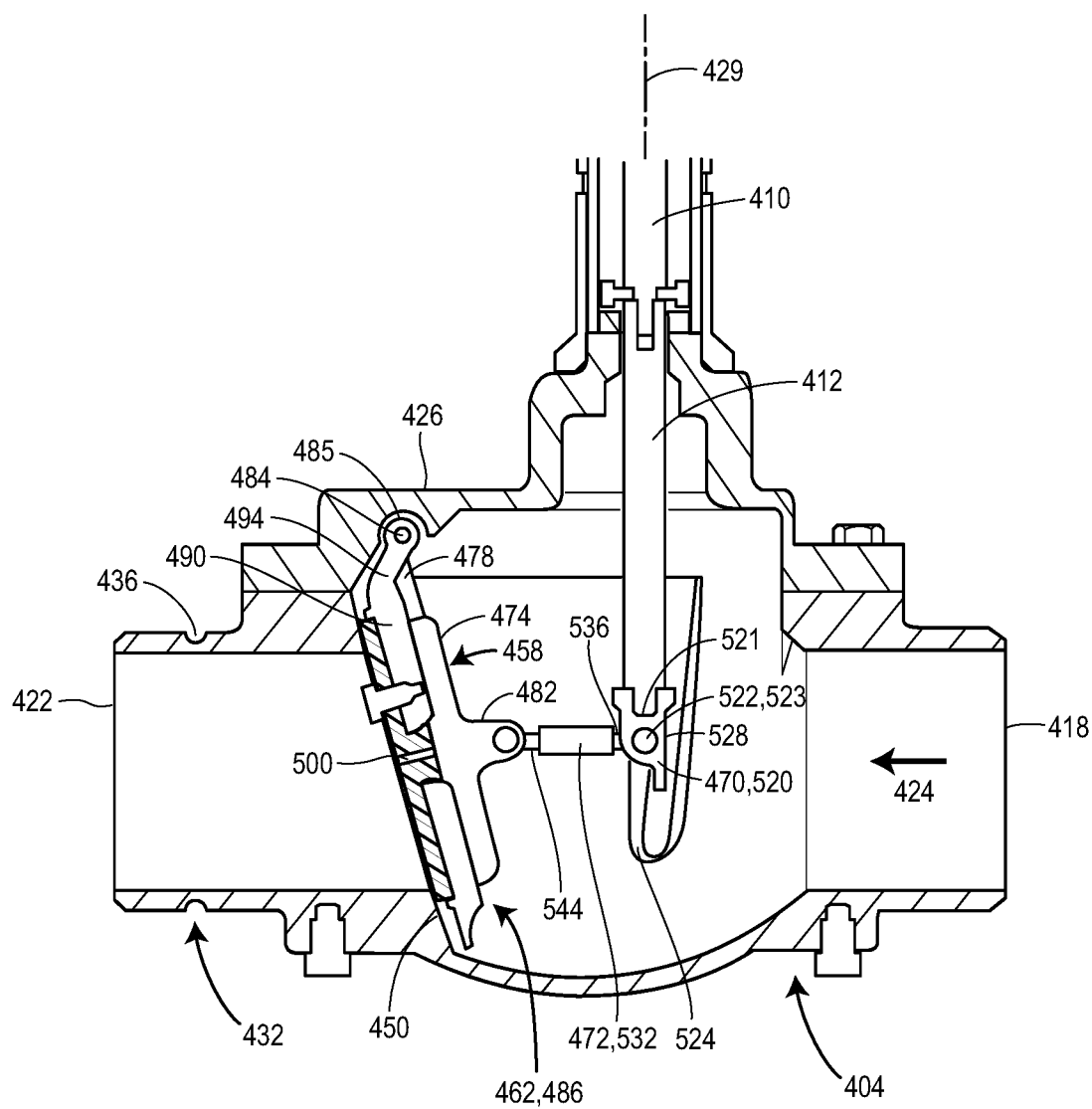
FIG. 15 is a partial, close up view of the internal components of the excess flow valve of FIG. 13 when the excess flow valve is in a closed position.

FIGS. 13-15 depict another example of a low-restriction excess flow valve 400 constructed in accordance with the principles of the present invention. Like the excess flow valve 100, the excess flow valve 400 is generally configured for use in gas or liquid applications (e.g., liquefied petroleum applications, liquefied natural gas applications, liquefied nitrogen applications), but it will be understood that the valve 400 can alternatively or additionally be used in other process control applications. In use, the excess flow valve 400 provides excess flow closure capacity protection while simultaneously providing minimal flow-restriction, thereby minimizing, if not eliminating, flow disruption and cavitation, which often occurs in known excess flow valves.

As illustrated in FIGS. 13 and 14, the excess flow valve 400 includes a valve body 404, a bonnet 408 coupled (e.g., removably coupled) to the valve body 404, and a sliding stem 410 and an internal shaft 412 each operatively coupled to the valve body 404 via the bonnet 408.

As illustrated in FIGS. 13 and 14, the body 404 has an inlet connection 416 that defines an inlet port 418, an outlet connection 420 that defines an outlet port 422, and a fluid flow passageway 424 extending between the inlet port 418 and the outlet port 422. While not illustrated herein, when the flow valve 400 is used in gas applications, the inlet connection 416 is connected to a tank (not shown), e.g., a cryogenic tank, and the outlet connection 420 is connected to piping downstream of the excess flow valve 400. Of course, when the valve 400 is used in other process transfer or control applications, the inlet and/or outlet connections 416, 420 can be connected to components in those process transfer or control systems, as appropriate. The inlet and/or outlet connections 416, 420 can be threaded, flanged, or welded. When connected, the excess flow valve 400 facilitates the transfer of fluid (e.g., gas, liquid) from the tank arranged upstream of the valve 400 to piping arranged downstream of the valve 400 via the fluid flow passageway 424.

The bonnet 408 is, at least in this example, removably coupled to the valve body 404, such that the bonnet 408 can be removed and the internal components of the valve 400 arranged therein can be repaired or serviced (and in some cases replaced) while the flow valve 400 remains in-line. The bonnet 408 in this example has a base portion 426 and a cylindrical portion 428 that extends upward from the base 426. The base 426 is removably coupled to a top portion of the valve body 404. The cylindrical portion 428 houses the internal shaft 412, which is disposed along an axis 429 that is substantially perpendicular (e.g., perpendicular) to the fluid flow passageway 424, and provides support for the sliding stem 410, which is also disposed along the axis 429 (i.e., the stem 410 and the shaft 412 are co-axial). The sliding stem 410 protrudes outside of the bonnet 408, and, more specifically, the cylindrical portion 428 of the bonnet. So positioned, a protruding end 430 of the stem 410 (or some other component coupled thereto) can be coupled to an external actuator (not shown), such as a pneumatic actuator, a manual actuator, a mechanical actuator, or an electric actuator, such that the sliding stem 410 can be controlled. When actuated, the sliding stem 410 moves upward or downward, which in turn moves the internal shaft 412 upward or downward in an identical manner.

With continued reference to FIGS. 13 and 14, the excess flow valve 400 also includes a break-away safety mechanism 432. Like the break-away safety mechanism 132 described above, the break-away safety mechanism 432 in this example takes the form of an area of the valve body 404 that is locally weaker in tension than the rest of the valve body 404. Specifically, the break-away mechanism 432 takes the form of a channel 436 that extends circumferentially around the valve body 404 between the bonnet 408 and the outlet connection 420. The channel 436 focuses tensile stresses so that in the event of an accident that damages the downstream piping, the valve body 404 fails in the region of the channel 436 before failing at any other location, thereby protecting the integrity of the internal components of the valve body 404 and sealing any fluid within the valve body 404. Optionally, external stiffening gussets can be added to the valve body 404 to add strength and robustness upstream of the break-away point (the location of the break-away mechanism 432).

As illustrated in FIGS. 14 and 15, the excess flow valve 400 also includes a seat 450 and a control assembly 454 that is movable relative to the seat 450 to control the fluid flow through the fluid flow passageway 424. While the seat 450 is integrally formed within the valve body 404 adjacent the outlet port 422, the seat 450 can alternatively be removably coupled thereto (and thus can be removed and replaced when necessary). The seat 450 can be made of metal, plastic (e.g., an elastomeric material), or combinations thereof. The seat 450 can be arranged at an angle relative to the fluid flow passageway 424 and the axis 429, as is illustrated in FIG. 14, or can be arranged along an axis that is substantially parallel (e.g., parallel) to the axis 429 (and thus substantially perpendicular to the fluid flow passageway 424).

The control assembly 454 is generally movable relative to the seat 450 between an open position, whereby the valve 400 is open and fluid flow is permitted through the fluid flow passageway 424, and a closed position, whereby the valve 400 is closed and no fluid flow is permitted through the fluid flow passageway 424. The control assembly 454 in this example includes the sliding stem 410, the internal shaft 412, a driving element 458, a valve member 462, a first biasing element 466 arranged in the cylindrical portion 428 of the bonnet 408 and operatively coupled to the sliding stem 410, and a second biasing element that is not shown but is arranged between the driving element 458 and the valve member 462 (and functions in an identical manner as the second biasing element 170 described above). The internal shaft 412 is coupled (e.g., fastened) to the sliding stem 410. The driving element 458 is, in turn, operatively connected to the internal shaft 412 via first and second links 470, 472. When the sliding stem 410 is externally actuated, thereby moving the sliding stem 410, the internal shaft 412 responds by moving in an identical manner. This drives the first and second links 470, 472, which facilitate the desired movement of the driving element 458 and the valve member 462, as will be described in greater detail below.

As best illustrated in FIGS. 14 and 15, the driving element 458 in this example has a base 474, an arm 478, and a neck 482. The arm 478 extends outwardly from the base 474 and is secured to, and surrounds, a rod 484 pivotally disposed in a channel 485 formed in the valve body 404, such that the driving element 458 is pivotally coupled to and within the valve body 404. The rod 484 and the channel 485 are generally arranged so as to minimize rotational motion, and overall motion, relative to the valve body 404, thereby optimizing the sealing engagement between the valve member 462 and the seat 450. The neck 482 extends outwardly from a central portion of the base 474. While the neck 482 is integrally formed with the base 474, the neck 482 can instead be coupled to the base 474 (e.g., via fasteners).

Referring still to FIGS. 14 and 15, the valve member 462 in this example takes the form of a flapper 486 having a base 490 and a pair of parallel arms 494 (only one of which is visible in FIG. 14). The base 490 in this example has a substantially annular shape, though a rectangular or other shape can be utilized instead. While difficult to see in FIGS.

14 and 15, a seating channel 498 is defined or formed along a periphery of the base 490 for receiving and sealingly engaging the seat 450 to shut-off flow through the valve 400 (i.e., to close the valve 400). The seating surface 498 can be metal, plastic (e.g., made of an elastomeric material), or combinations thereof. The valve member 462 also includes a bleed hole 500 defined or formed in a portion of the base 490. The bleed hole 500 is configured to facilitate limited bleeding to facilitate pressure equalization across the valve 400, as will be described below. The bleed hole 500 in this example is centrally located on the base 490 and is surrounded by the seating surface 498, though in other examples the bleed hole 500 can be arranged elsewhere. The arms 494 extend outwardly from the base 490 and are secured to, and surround, different portions of the rod 484, such that the valve member 462, like the driving element 458, is pivotally coupled to and within the valve body 404. While not explicitly illustrated in FIGS. 14 and 15, the arm 478 of the driving element 458 is secured to the rod 484 at a position between (i.e., radially inward of) the arms 494 of the valve member 462.

As best illustrated in FIG. 14, the first biasing element 466 in this example takes the form of a coil spring 512 arranged within the cylindrical portion 428 of the bonnet 408. More specifically, the coil spring 512 is arranged between a top portion 513 of the bonnet 408 and a seat 516 arranged adjacent an end 518 of the stem 410 opposite the protruding end 430. So arranged, the first biasing element 466 is configured to bias the driving element 458 away from the base 426 of the bonnet 408 and toward the seat 450, i.e., to a closed position (see FIG. 15).

While not explicitly illustrated herein, the second biasing element of the valve 400 is identical in structure and function to the second biasing element 170 described above. As such, the second biasing element of the valve 400 takes the form of a torsion spring having a first end coupled to a portion of the driving element 458 and a second end, opposite the first end, secured around the arms 494 of the valve member 462. So arranged, the second biasing element of the valve 400 is configured to bias the driving element 458 and the valve member 462 toward one another.

With reference specifically to FIG. 15, the first link 470 in this example takes the form of an H-shaped element 520 that has one portion 521 secured (e.g., via fasteners) to the internal shaft 412 and another portion 522 pivotally coupled to the second link 472 at a pivot joint 523. When the control assembly 454 is in the open position, and for a significant portion of the travel stroke of the sliding stem 410, the link element 520 is movably disposed along the axis 429. When, however, the sliding stem 410 is near the end of its travel stroke, and the control assembly 454 is close to the closed position, the pivot joint 523 is guided along, and supported by, a ramp 524 that is formed within and extends inwardly from the valve body 404. As illustrated in FIG. 14, the ramp 524 defines a guide path that is oriented at an angle θ relative to the axis 429. The guide path may be oriented at an approximately 5 degree, approximately 10 degree, approximately 15 degree, or some other degree angle relative to these axes. In any event, because the ramp 524 defines a slightly curved guide path, the pivot joint 523, which is guided by the ramp 524, is forced to travel along this curved guide path.

The second link 472 is generally configured to convert the translational motion of the internal shaft 412 into rotational movement of the driving element 458. The second link 472 in this example takes the form of a substantially cylindrically shaped element 532 having one end 536 pivotally coupled to the first link 470 at the pivot joint 523 and another end 544 pivotally coupled to the neck portion 482 of the driving element 458 at a pivot joint 548. So arranged, the link element 532 pivots about the pivot joints 523, 548 as the valve 400 is moved between the open and closed positions.

With the valve 400 constructed as described, the valve 400 is configured to provide an excess flow closure function and, at the same time, minimal flow-restriction. Moreover, the excess flow valve 400 is configured to protect the integrity of the valve sealing area and contain any fluid within the valve 400 in the event of an accident that damages piping downstream of the valve 400. FIGS. 14 and 15 will also be used to describe how the excess flow valve 400 can, in operation, achieve these functions.

FIG. 15 illustrates the valve 400 in its initial, closed position, which is similar to the closed position of the valve 100 described above (and illustrated in FIG. 7) and which occurs when the sliding stem 410 is not actuated by the external actuator (i.e., no external actuation is applied to the sliding stem 410). Without such actuation, the control assembly 454 is oriented in a closed position in which the driving element 458 and the valve member 462 are slightly angled relative, but substantially perpendicular, to the fluid flow passageway 424, the valve member 462 sealingly engages the seat 450, and the driving element 458 is in direct contact with the valve member 462. The driving element 458 not only supports the valve member 462, but also covers the bleed hole 500 of the valve member 162, thereby preventing any fluid flow between the inlet port 418 and the outlet port 422. The control assembly 454 is so oriented because the first biasing element 466 biases the driving element 458 toward the seat 450, while the second biasing element of the valve 400 biases the driving element 458 and the valve member 462 toward one another. With no external actuation forces present, the biasing forces applied by the first and second biasing elements maintain the control assembly 454 in this closed position. Moreover, any fluid flow upstream of the closed control assembly 454 will apply a net force on the underside of the driving element 458, helping to maintain the driving element 458 and the valve member 462 in the closed position.

As FIG. 15 also illustrates, when the valve 400 is in the closed position, the link element 520 is oriented at an angle relative to the fluid flow passageway 424 and the axis 429, that angle corresponding to the angle of the guide path defined by the ramp 524. The link element 520 converts the vertical, actuation force applied by the external actuator (and transmitted via the stem 410 and the shaft 412) into a horizontal, axial force that is transmitted to the link element 532. The link element 532, which is substantially parallel to the fluid flow passageway 424 and substantially perpendicular to the axis 429, applies this horizontal force, i.e., applies the force in a direction substantially parallel to the fluid flow passageway 424, to the valve member 462, keeping the valve member 462 in sealing engagement with the seat 450. Not only does the link element 520 help to convert or leverage the vertical, actuation force into an axial force that keeps the valve member 462 closed, but because the curved ramp 524 acts upon the pivot joint 523 in the manner described above, the control assembly 454, particularly the valve member 462, can be maintained in the closed position with less force than would otherwise be required. In other words, because of the curved ramp 524, the stem 410 and the shaft 412 need not apply as much as force as conventionally would be required to keep the valve member 462 in sealing engagement with the seat 450. This may, in return, permit the use of a smaller external actuator than would otherwise be needed.

When, however, an external actuation force that exceeds the biasing force exerted by the first biasing element 466 is applied by the external actuator to the sliding stem 410, the stem 410 moves in such a way that causes the valve 400 to move to a limited bleed position, which is not shown but is similar to the limited bleed position of the valve 100 described above (and illustrated in FIG. 8). More specifically, the stem 410 is driven upward, away from the valve body 404, which causes the shaft 412 to move upward as well. The external actuation force will drive the stem 410 upward until it reaches the end of its travel stroke. At least initially, until the pressure at the outlet port 422 is substantially equal to the pressure at the inlet port 418, the driving element 458 will be moved away, and thus separated, from the valve member 462. This occurs because the pressure associated with fluid flow upstream of the seat 450 initially exceeds the pressure associated with fluid flow downstream of the seat 450; therefore, the fluid flow will apply a net force (leftward) on the valve member 462, keeping the valve member 462 in sealing engagement with the seat 450. As the driving element 458 has been moved away from the valve member 462, thereby uncovering the bleed hole 500, fluid will begin flowing (or bleeding) to the outlet port 422 through the bleed hole 500 formed in the valve member 462. This bleeding will continue until pressure equalization, whereby the pressure at the outlet port 422 is substantially equal to the inlet port 418, has been achieved.

When pressure equalization has been achieved, the fluid flow in the valve 400 will no longer apply any significant forces on the valve member 462, thereby enabling the valve 400, specifically the control assembly 454, to move to the open position illustrated in FIG. 14. More specifically, pressure equalization enables the valve member 462 to swing or rotate in a clockwise direction toward and into contact with the driving element 458. The driving element 458 and the valve member 462 are subsequently arranged at an angle relative to the fluid flow passageway 424. As illustrated in FIG. 14, the control assembly 454, particularly the valve member 462, is seated substantially outside of the fluid flow passageway 424, with only an end portion of the control assembly 454 being disposed within the fluid flow passageway 424. As such, the control assembly 454, particularly the valve member 462, provides very little restriction against any fluid flowing in the fluid flow passageway 424. Indeed, this allows the valve 400 to have a flow coefficient $C_v$ greater than the flow coefficient $C_v$ for known excess flow internal valves. As an example, the valve 400 may have a flow coefficient $C_v$ of approximately 250-350, whereas known excess flow internal valves typically have a flow coefficient $C_v$ of approximately 100. The size and/or shape of the fluid flow passageway 424 can, if desired, be altered to increase or decrease the flow coefficient $C_v$. In any event, the valve 400, by providing minimal fluid flow-restriction, substantially reduces, if not eliminates, the risk for cavitation, which can occur as a result of flow disruption.

When the control assembly 454 is in the fully open position illustrated in FIG. 14, fluid can flow freely in the fluid flow passageway 424 from the inlet port 418 to the outlet port 422. However, in the event that fluid flow entering the valve 400 through the inlet port 418 reaches an excess flow condition, the valve 400, specifically the control assembly 454, moves to the limited bleed position discussed above. As is known in the art, the excess flow condition occurs when the fluid flow reaches or exceeds a predetermined limit, typically caused by pressure loss in the process transfer or control system (e.g., because a downstream pipe has broken, etc.). This predetermined limit may, for example, correspond to a percentage (e.g., 200%) of the capacity the valve 100 is designed to handle. In any event, when this excess flow condition has been reached, the drag force from the fluid entering the valve 400 through the inlet port 418 will exceed the biasing force applied by the second biasing element 470, and, as such, the drag force will drive the valve member 462 in a counter-clockwise direction. The drag force drives the valve member 462 away from the driving element 158, which remains in the fully open position, and toward and into sealing engagement with the valve seat 450. Because the driving element 458 remains in the fully open position, the bleed hole 500 in the valve member 462 is exposed, such that a limited amount of fluid can flow (i.e., bleed) therethrough.

It will be appreciated that because the control assembly 454 is substantially seated outside of the fluid flow passageway 424 in the fully open position, the pressure drop across the valve member 462 is significantly lower than the pressure drop seen in known excess flow internal valves. In other words, the valve 400 has the ability to provide a higher excess flow capacity than known excess flow internal valves.

In the event that the process transfer or control system breakage is fixed, thereby alleviating the excess flow condition, the limited bleeding through the bleed hole 500 persists until pressure equalization has been restored. In other words, the control assembly 454 remains in the bleed position, and fluid flows through the bleed hole 500, until the pressure at the outlet port 422 is substantially equal to the pressure at the inlet port 418. When pressure equalization has been restored, the second biasing element pulls the valve member 462 back to the position illustrated in FIG. 14, thereby returning the valve 400, specifically the control assembly 454, to the fully open position.

In the event that the process transfer or control system cannot be fixed or fixing the process transfer or control system is not desirable, the valve 400 can be easily and safely fully shutoff by de-energizing the external actuation (i.e., removing the actuation force applied to the stem 410). Without any external actuation, the control assembly 454 returns to the closed position illustrated in FIG. 15. More specifically, the driving element 458 moves toward and into contact with the valve member 462, which is already in sealing engagement with the seat 450. This movement of the driving element 458 covers the bleed hole 500, eliminating the limited bleed through the valve 400 and fully closing the valve 400.

FIGS. 16-19 illustrate an actuator assembly 600 operatively coupled to another example of a low-restriction excess flow valve 604 constructed in accordance with the principles of the present invention. The excess flow valve 604 is substantially similar to the excess flow valve 400 illustrated in FIGS. 13-15, with common reference numerals used to refer to common components.

Figure 16:
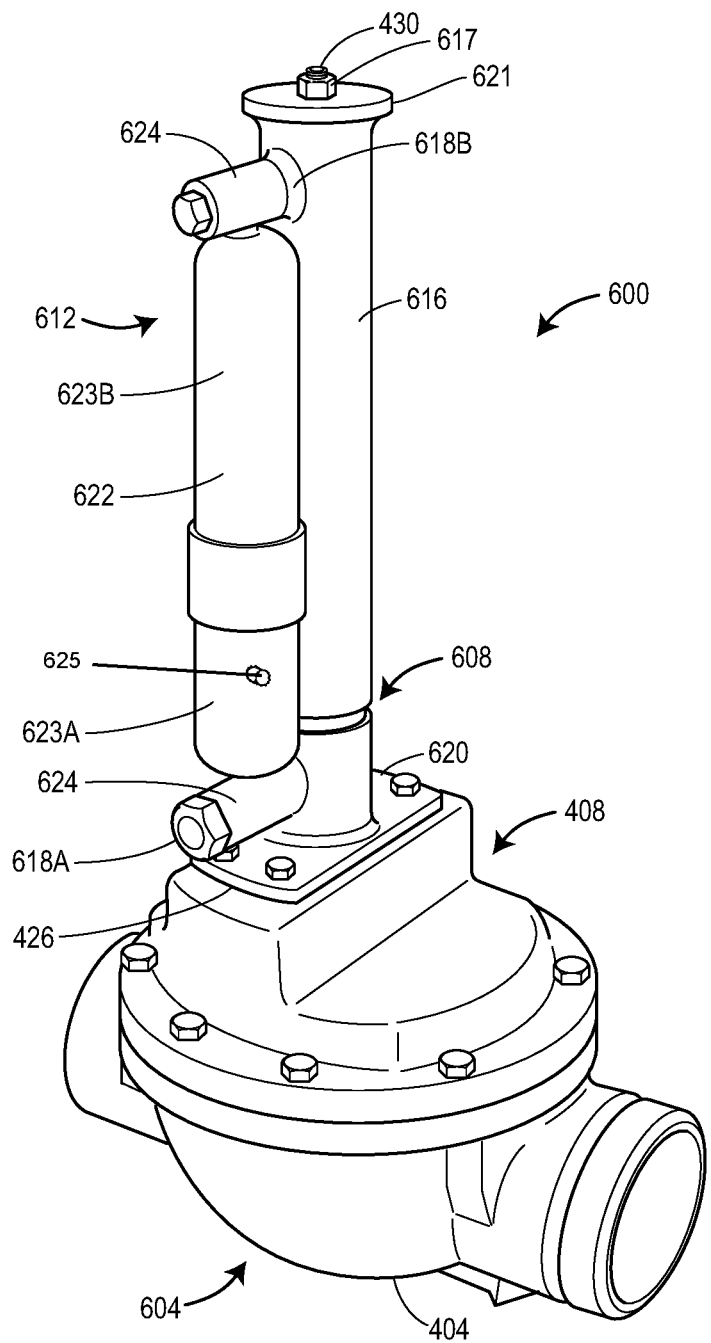
FIG. 16 is a perspective view of one example of an actuator assembly that can be utilized in connection with another example of an excess flow valve constructed in accordance with the teachings of the present invention.

As illustrated in FIG. 16, the actuator assembly 600 includes a mounting assembly 608 for mounting an actuator 612 to the valve 604 in a manner that does not increase the vertical footprint of the valve 604. The mounting assembly 608 includes a mounting sleeve 616 and a mounting bracket 620. The mounting sleeve 616 is removably coupled to the stem 410 (and, as a result, is also movable relative to the valve body 404). More specifically, the mounting sleeve 616 is disposed over a substantial portion of the cylindrical portion 428 of the bonnet 408, with an upper end 621 of the mounting sleeve 616 secured to the protruding end 430 of the stem 410 via a fastener 617; if desired, the mounting sleeve 616 can be decoupled from the stem 410 by removing the fastener 617. In any event, when the mounting sleeve 616 is coupled to the stem 410 in the described manner, the stem 410 and the mounting sleeve 616 move upward or downward together, such that movement of the sleeve 616 raises or lowers the stem 410. The mounting bracket 620, meanwhile, is removably secured (e.g., via fasteners) to the base portion 426 of the bonnet 408. When secured to the bonnet 408, the mounting bracket 620 is fixed relative to the valve body 404, such that the mounting sleeve 616 is movable relative to the mounting bracket 620.

As also illustrated in FIG. 16, the mounting assembly 608 also includes a pair of arms 618A, 618B that extend outward in a direction perpendicular to the length of the sleeve 616. The first arm 618A is coupled to, and extends outward from, the mounting bracket 620, while the second arm 618B is coupled to, and extends outward from, a portion of the mounting sleeve 616 proximate to the upper end 621. It will thus be appreciated that the second arm 618B is movable relative to the mounting bracket 620 (and the valve body 404), while the first arm 618A is not, at least in this example.

The actuator 612 is an adjustable shock absorber that has a cylindrical body 622 and a pair of tube-like ends 624. As illustrated in FIG. 16, the cylindrical body 622 has an inlet 625 adapted to receive a pressure source (not shown), such that the cylindrical body 622 can be pressurized to open the valve 600. The cylindrical body 622 includes a first body portion 623A and a second body portion 623B that is telescopically engaged in the first body portion 623A. The first body portion 623A is coupled to (e.g., integrally formed with) one of the tube-like ends 624, and the second body portion 623B is coupled to (e.g., integrally formed with) the other of the tube-like ends 624. As illustrated in FIG. 16, each of the tube-like ends 624 defines an opening that is sized to receive a corresponding one of the arms 618A, 618B when the actuator 612 is mounted to the valve 604 via the mounting assembly 608. The opening of the tube-like end 624 of the first body portion 623A receives the arm 618A, and the opening of the tube-like end 624 of the second body portion 623B receives the arm 618B. By virtue of this arrangement, the second body portion 623B can, responsive to pressurization of the cylindrical body 622 via the inlet 625, move relative to the first body portion 623A to increase or decrease an interior area of the cylindrical body 622.

Figure 17:
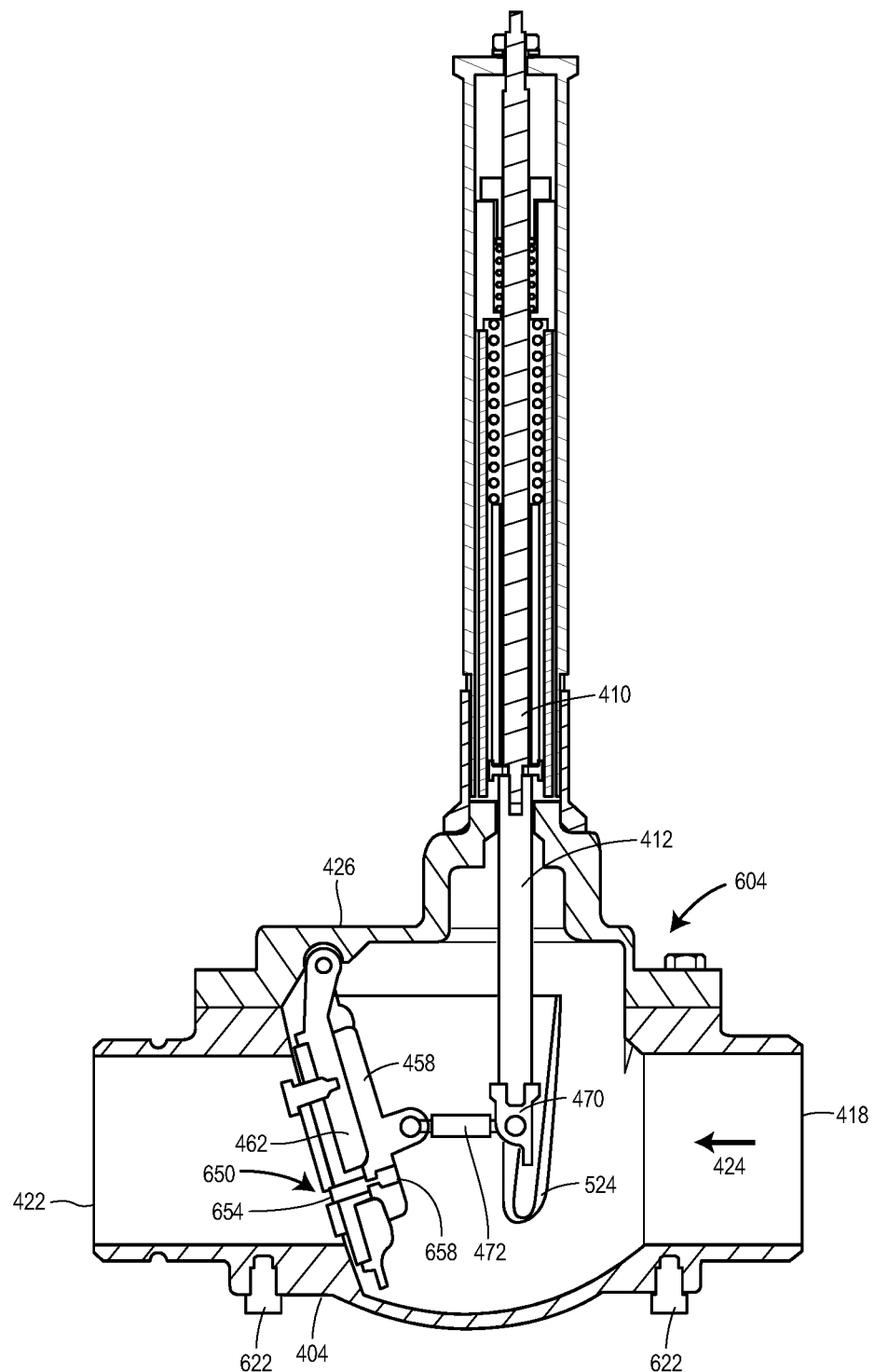
FIG. 17 is a front perspective view of the internal components of the excess flow valve of FIG. 16 when the excess flow valve is in a closed position.
Figure 18:
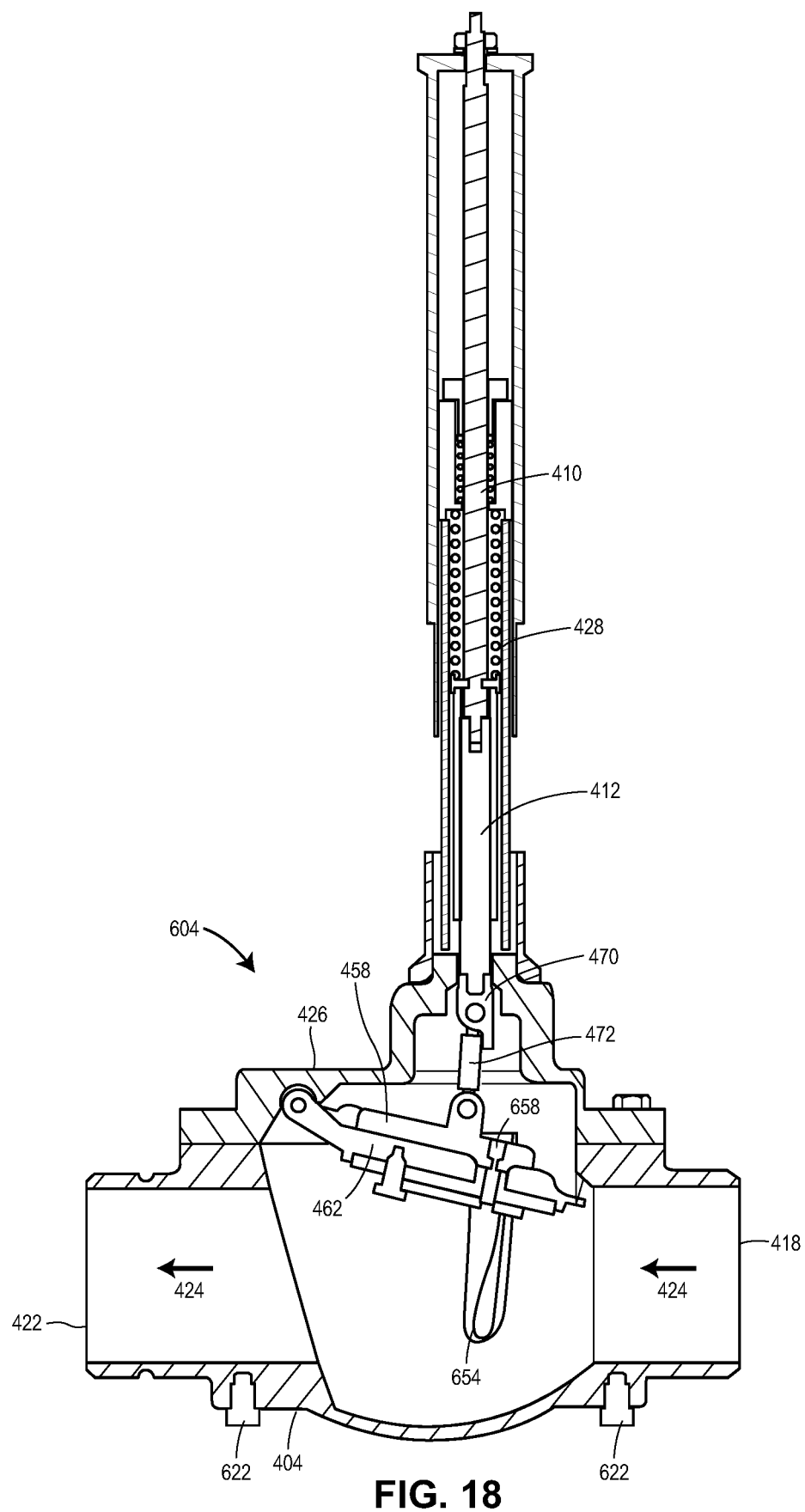
FIG. 18 is a front perspective view of the internal components of the excess flow valve of FIG. 16 when the excess flow valve is in an open position.

While the excess flow valve 604 is described above as being substantially similar to the excess flow valve 400, the flow valve 604 differs from the flow valve 400 in two main respects. First, the valve 604 includes a different means of facilitating limited bleeding than the valve 400. Unlike the valve 400, which includes the selectively openable bleed hole 500, the valve 604 includes a bleed mechanism 650 that includes a bleed hole 654 and a check or bleed valve 658, as illustrated in FIGS. 17 and 18. The bleed hole 654 is defined or formed in the valve in an interior portion of the base 490 of the valve member 462, while the bleed valve 658 is arranged in an interior portion of the base 474 of the driving element 458 at a position adjacent (e.g., aligned with) the bleed hole 654. The bleed mechanism 650 facilitates back pressure relief by bleeding fluid through the bleed valve 658 when higher pressure fluid is trapped downstream of the sealed seat 450. As an example, the bleed mechanism 650 may facilitate bleeding when liquid trapped downstream of the seat 450 has turned into a higher pressure vapor. The bleed mechanism 650 is advantageous because it reduces, if not eliminates, the need for additional relief valves mounted downstream of the flow valve 604 (when, e.g., trapped liquid downstream turns to higher pressure vapor). Secondly, the flow valve 604 includes one or more gauge ports 662 that allow an end user to monitor pressure drop across the valve 604, e.g., to determine blockage. The flow valve 604 illustrated in FIGS. 17 and 18 includes a pair of gauge ports 662, one disposed adjacent the inlet 418 and one disposed adjacent the outlet 422. In other examples, however, the flow valve 604 may only include one such gauge port. Regardless, when not being used to monitor pressure, the gauge ports 662 can be plugged.

Figure 19:
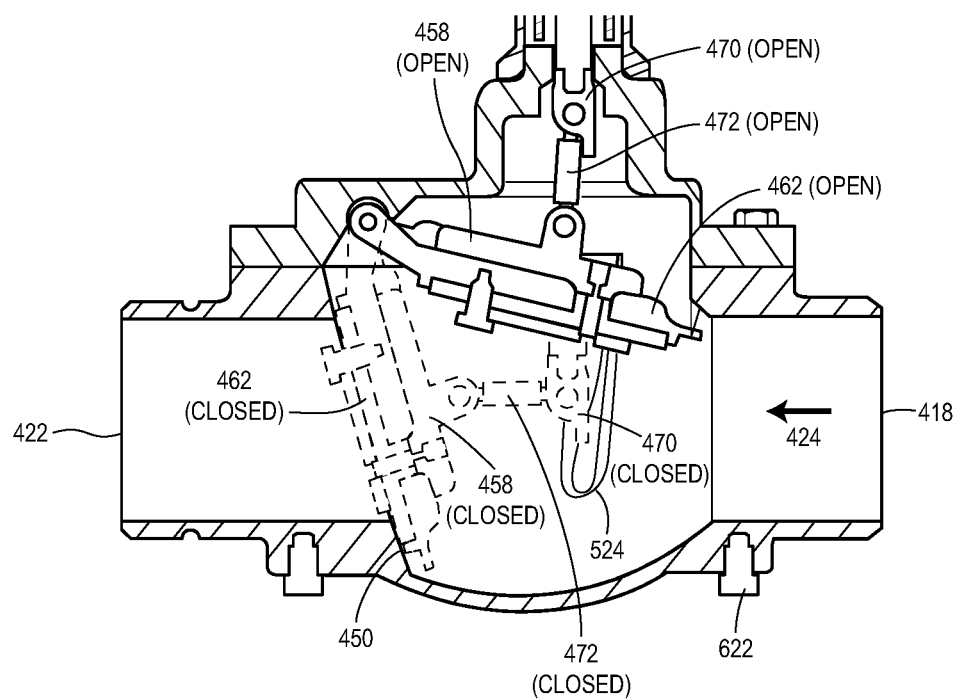
FIG. 19 is a front perspective view illustrating the internal components of the excess flow valve of FIG. 16 in each of the closed and open positions.

Notwithstanding these differences, the valve 604 is operable in a similar manner as the valve 400. FIGS. 16 and 17 illustrate the valve 604 in a closed position, which is substantially similar to the closed position of the valve 400. Here, however, when it is desired to move the valve 604 from this closed position to the open position illustrated in FIG. 18, which is substantially similar to the open position of the valve 400, the actuator 612 can be pressurized (e.g., via the inlet 625 of the body 622). Pressurization of the actuator 612 causes the second body portion 623B to move upward (at least in FIG. 16) relative to the first body portion 623A, thereby expanding the actuator body 622, which raises the mounting sleeve 616 (which is coupled to the second body portion 623B), and, in turn, raises the stem 410 (which is coupled to the sleeve 616). Actuation of the stem 410 in this manner moves the driving element 458 and the valve member 462 from the closed position shown in FIG. 17 to the open position shown in FIG. 18. Conversely, by de-pressurizing the actuator 612, the valve 604 can be moved from the open position back to the closed position. Depressurization of the actuator 612 causes the second body portion 623B to move downward (at least in this example) relative to the first body portion 623A, thereby contracting the actuator body 622 back to the position shown in FIG. 16, which lowers the mounting sleeve 616 (which is coupled to the second body portion 623B), and, in turn, lowers the stem 410. Actuation of the stem 410 in this manner moves the driving element 458 and the valve member 462 from the open position shown in FIG. 18 back to the closed position shown in FIG. 17. FIG. 19 illustrates the components of the control assembly 454 when the valve 400 is in both the closed and open positions.

Figure 20:
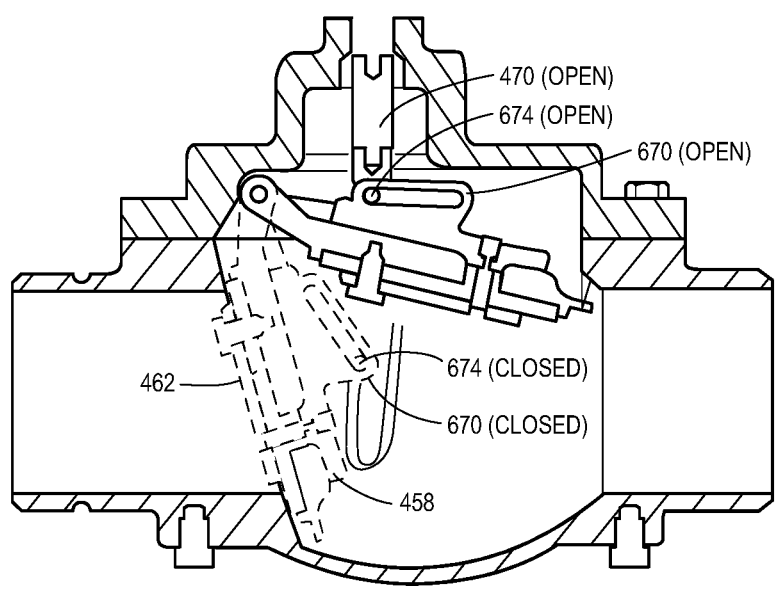
FIG. 20 illustrates another example of an excess flow valve constructed in accordance with the principles of the present invention.

It will also be appreciated that the valve 400 and/or the valve 604 can vary and yet still perform the intended functionality. The valve body 404, the bonnet 408, the stem 410, the shaft 412, and/or the break-away shaft mechanism 432 can vary from what is illustrated and yet still perform the intended functionality. More specifically, the shape, size, and/or style of the valve body 404 can vary. In one example, the shape and/or size of the inlet and/or outlet connections 416, 420 can vary, for example when it is desired to utilize the excess flow valve 400 in a different environment having different sized tanks and/or piping. In some examples, the shaft 412 can be arranged in a different manner, e.g., oriented along a different axis or located in a different position relative to the flow path (e.g., further from the outlet port 422). Alternatively or additionally, the construction and/or actuation of the control assembly 454 can vary from what is illustrated and yet still perform the intended functionality. In other examples, the shape and/or size of the driving element 458 and/or the valve member 462 can be varied to, for example, alter the excess flow capacity of the valve, to alter the necessary actuation force and/or biasing force(s), or for some other reason. In other examples, the driving element 458 and the valve member 462 can be operatively coupled to the stem 410 and the shaft 412 in a different manner. For example, as illustrated in FIG. 20, a 2-bar mechanism 670 with a sliding joint 674 can be employed instead of the link element 472. Of course, the shape of the slot that guides the sliding joint can be varied (e.g., the angle can be adjusted) to vary the travel versus force or travel versus opening.

Figure 21:
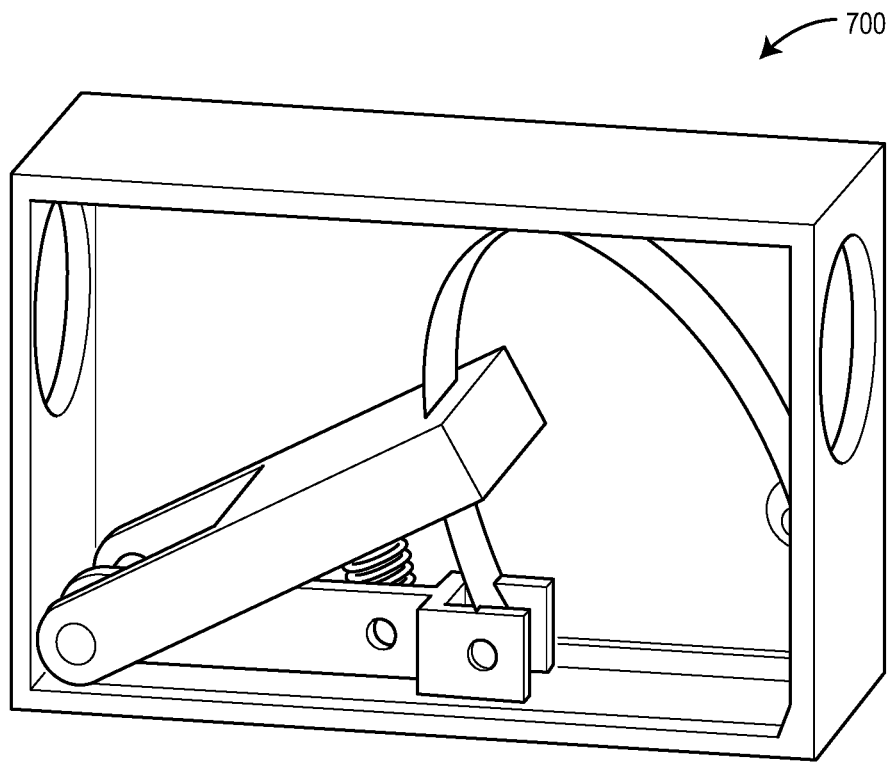
FIG. 21 illustrates another example of an excess flow valve constructed in accordance with the principles of the present invention.
Figure 22:
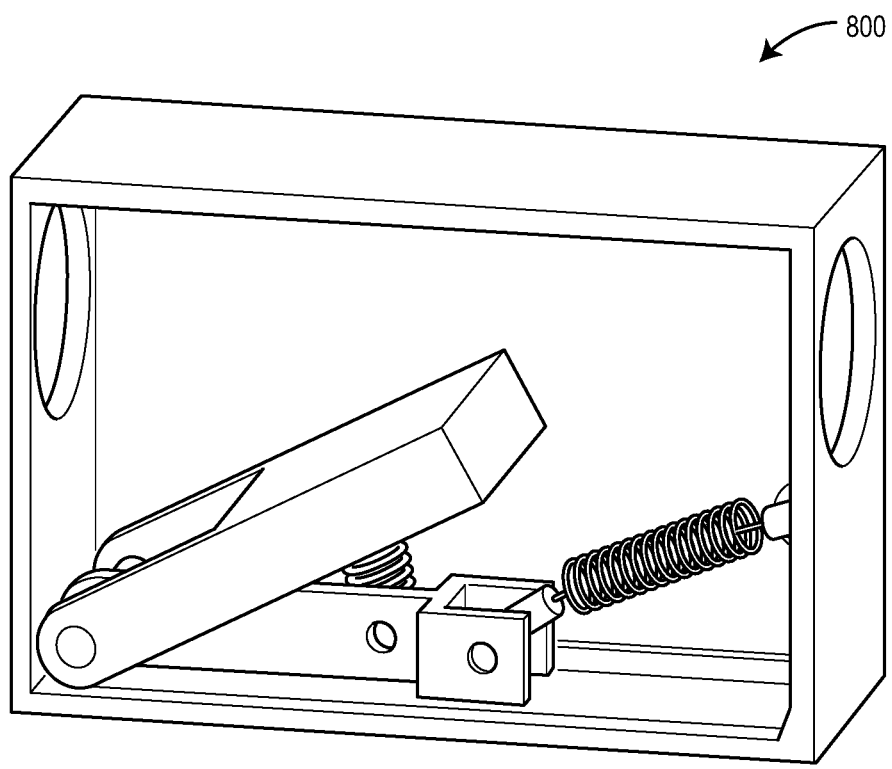
FIG. 22 illustrates another example of an excess flow valve constructed in accordance with the principles of the present invention.
Figure 23:
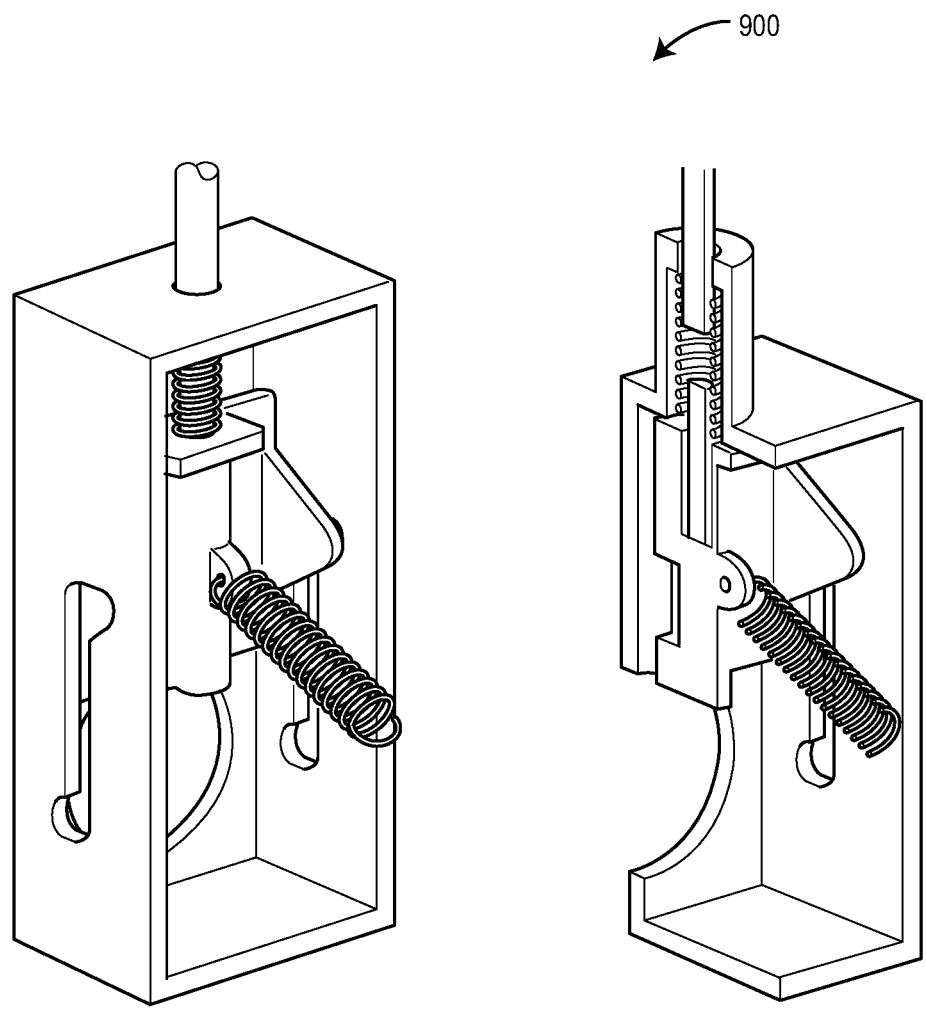
FIG. 23 illustrates another example of an excess flow valve constructed in accordance with the principles of the present invention.

While not described in detail, FIGS. 21, 22, and 23 each illustrate alternative excess flow valves 700, 800, and 900, respectively, constructed in accordance with one or more aspects of the present invention. The excess flow valves 700, 800, and 900 operate in a similar manner as the excess flow valves 100, 400, and 604 described herein.

Finally, it will be appreciated that any of the excess flow valves described herein can include various combinations of the components described herein and/or a number of other components not explicitly illustrated herein. As an example, the valve body of any of the described excess flow valves can include a gauge port that allows an end user to perform leak testing. As another example, any of the described excess flow valves can include a flow strainer mounted at the inlet port and/or the outlet port in order to reduce the amount of solid contaminants in the process transfer or control system. Moreover, one or more different members can be introduced around the driving element 158 and the valve member 162 so that the opening action is accomplished with a "pressure balanced" member. In one example, the pressure balanced member can take the form of a piston that is slidably disposed against the valve member 162 and is initially only exposed to inlet pressure, but which allows flow once it slides through the valve member 162 (see FIG. 16). In another example, the pressure balanced member can take the form of a butterfly type element that allows flow once pivoted. In yet another example, the pressure balanced member can take the form of a flat element that slides over the valve member 162. In any event, by utilizing one or more different pressure balanced members, this eliminates the need for initial pressure equalization, as the opening valve member will be at static equilibrium almost immediately after the pressure balanced member is opened.

Based on the foregoing description, it should be appreciated that the valve described herein provides safe and effective excess flow closure functionality, but does so with minimal flow-restriction, thereby minimizing, if not eliminating, flow disruption and cavitation, which is a problem caused by known excess flow valves, especially when installed in a pump supply line. The valve described herein also has a break-away safety feature that facilitates break-off in the event of an accident that damages downstream piping, which serves to protect the integrity of the valve sealing area and sealingly contains fluid within and upstream of the valve.

The invention claimed is:

1. A valve, comprising:
a control assembly that is configured to control fluid flow through the valve, the control assembly comprising a driving element and a valve member,
wherein the driving element is rotatable about an axis between a first operating state in which the driving element maintains contact between the valve member and a valve seat and a second operating state in which the driving element does not maintain contact between the valve member and the valve seat, and
wherein the valve member is rotatable about the axis entirely independent of the driving element when the driving element is in the second operating state.

2. The valve of claim 1, wherein the valve member comprises a bleed hole.

3. The valve of claim 2, wherein, when the driving element is in the second operating state, the valve member is rotatable between a first position in which the valve member contacts the valve seat and a second position in which the valve member is separated from the valve seat.

4. The valve of claim 3, wherein, when the driving element is in the second operating state and the valve member is in the first position, fluid is permitted to flow through the bleed hole from an inlet of the valve to an outlet of the valve.

5. The valve of claim 3, wherein the driving element comprises a check valve that is proximate to the bleed hole when the driving element is in the first operating state.

6. The valve of claim 5, wherein:
when the driving element is in the second operating state and the valve member is in the first position, fluid is permitted to flow through the bleed hole from an inlet of the valve to an outlet of the valve, and
when the driving element is in the first operating state, fluid is permitted to flow through the bleed hole and the check valve only from the outlet of the valve to the inlet of the valve.

7. The valve of claim 2, wherein the driving element is configured to prevent fluid flow through the bleed hole when the driving element is in the first operating state.

8. The valve of claim 1, wherein the driving element is biased toward the first operating state, and wherein the valve member is biased away from the valve seat.

9. The valve of claim 1, further comprising a valve shaft that is accessible outside of a body of the valve.

10. The valve of claim 9, wherein the valve shaft is positioned along the axis.

11. The valve of claim 9, wherein the valve shaft is rotatable to cause the driving element to move from the first operating state to the second operating state.

12. A valve, comprising:
a valve body that defines at least a portion of a fluid flow path between an inlet and an outlet;
a valve seat that is positioned along the fluid flow path; and
a control assembly that comprises:
a valve member that is rotatable about an axis between a first member position in which the valve member contacts the valve seat and a second member position in which the valve member is separated from the valve seat; and
a driving element that is rotatable about the axis between a first element position in which the driving element prevents rotation of the valve member and a second element position in which the driving element permits rotation of the valve member,
wherein, when the driving element is in the second element position, the valve member is rotatable from the second member position to the first member position when a fluid force that operates on the valve member overcomes a biasing force provided by a valve member biasing element.

13. The valve of claim 12, wherein the valve member comprises a bleed hole.

14. The valve of claim 13, wherein the valve member is biased toward the second member position by the valve member biasing element.

15. The valve of claim 14, further comprising an external excess flow adjuster that is configured to enable adjustment of a position of a portion of the valve member that is within the flow path and the corresponding fluid force that operates on the valve member.

16. The valve of claim 15, wherein, when the driving element is in the second element position and the valve member is in the first member position, fluid is permitted to flow through the bleed hole.

17. The valve of claim 13, wherein the driving element comprises a check valve that is aligned with the bleed hole when the driving element contacts the bleed hole.

18. The valve of claim 17, wherein the check valve permits fluid flow from the outlet to the inlet through the bleed hole when the driving element is in the first element position.

19. The valve of claim 12, further comprising a valve shaft that is positioned along the axis, wherein the valve shaft is rotatable to cause the driving element to move from the first element position to the second element position.

20. The valve of claim 12, wherein, when the driving element is in the second element position, the valve member is rotatable independent of the driving element throughout rotation between the first member position and the second member position.

21. A valve, comprising:

a control assembly that is configured to control fluid flow through the valve, the control assembly comprising a driving element and a valve member, wherein the driving element is rotatable about an axis between a first operating state in which the driving element maintains contact between the valve member and a valve seat and a second operating state in which the driving element does not maintain contact between the valve member and the valve seat, and wherein, when the driving element is in the second operating state, the valve member is rotatable between a first position in which the valve member contacts the valve seat and a second position in which the valve member is separated from the valve seat, and wherein, the valve member is rotatable independent of the driving element throughout rotation between the first position and the second position.

\* \* \* \* \*

UNITED STATES PATENT AND TRADEMARK OFFICE
CERTIFICATE OF CORRECTION

PATENT NO. : 10,907,746 B2  
APPLICATION NO. : 16/448760  
DATED : February 2, 2021  
INVENTOR(S) : Juan M. Diaz et al.

Page 1 of 1

It is certified that error appears in the above-identified patent and that said Letters Patent is hereby corrected as shown below:

On the Title Page

At Item (57), Line 2, "valve," should be -- valve. --.

In the Specification

At Column 1, Line 10, "2016" should be -- 2016, now Pat. No. 10,344,880, --.

At Column 10, Lines 12-13, "the break-away shaft mechanism 132" should be -- the break-away safety mechanism 132 --.

At Column 10, Line 41, "the break-away shaft mechanism 132" should be -- the break-away safety mechanism 132 --.

At Column 10, Lines 44-45, "the break-away shaft mechanism 132" should be -- the break-away safety mechanism 132 --.

At Column 16, Lines 8-9, "second biasing element 470," should be -- second biasing element, --.

At Column 17, Line 29, "valve 600." should be -- valve 604. --.

At Column 18, Lines 47-48, "the break-away shaft mechanism 432" should be -- the break-away safety mechanism 432 --.

Signed and Sealed this  
Sixteenth Day of November, 2021

Drew Hirshfeld  
*Performing the Functions and Duties of the*  
*Under Secretary of Commerce for Intellectual Property and*  
*Director of the United States Patent and Trademark Office*